(12) United States Patent
Yanchina et al.

(10) Patent No.: US 12,536,369 B2
(45) Date of Patent: Jan. 27, 2026

(54) SYSTEMS AND METHODS FOR EXTRACTING TABLES FROM DOCUMENTS

(71) Applicant: Canva Pty Ltd, Surry Hills (AU)

(72) Inventors: Velislava Petrova Yanchina, Byron Bay (AU); Stephan Schwiebert, Sydney (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 19/171,030

(22) Filed: Apr. 4, 2025

(65) Prior Publication Data

US 2025/0322148 A1  Oct. 16, 2025

(30) Foreign Application Priority Data

Apr. 10, 2024  (AU) .................. 2024202305

(51) Int. Cl.
*G06F 40/177* (2020.01)
*G06F 40/106* (2020.01)
*G06F 40/174* (2020.01)

(52) U.S. Cl.
CPC .......... *G06F 40/177* (2020.01); *G06F 40/106* (2020.01); *G06F 40/174* (2020.01)

(58) Field of Classification Search
CPC ..... G06F 40/177; G06F 40/106; G06F 40/174
See application file for complete search history.

(56) References Cited

U.S. PATENT DOCUMENTS

| | | | | |
|---|---|---|---|---|
| 9,703,766 | B1* | 7/2017 | Kyre ..................... | G06F 40/177 |
| 10,990,814 | B2* | 4/2021 | Venkateswaran .... | G06V 30/153 |
| 11,200,413 | B2* | 12/2021 | Burdick ................. | G06F 40/284 |
| 2006/0262976 | A1 | 11/2006 | Hart et al. | |
| 2008/0294679 | A1 | 11/2008 | Gatterbauer et al. | |
| 2010/0174732 | A1 | 7/2010 | Levy et al. | |
| 2011/0249905 | A1* | 10/2011 | Singh .................... | G06V 30/412 |
| | | | | 382/225 |
| 2016/0055376 | A1* | 2/2016 | Koduru ................. | G06V 30/412 |
| | | | | 382/176 |
| 2019/0122043 | A1* | 4/2019 | Bala ...................... | G06V 30/416 |
| 2020/0097451 | A1 | 3/2020 | Pisipati et al. | |

(Continued)

FOREIGN PATENT DOCUMENTS

| | | |
|---|---|---|
| AU | 2021201345 A1 | 9/2022 |
| AU | 2023210531 B1 | 11/2023 |
| WO | 2007129288 A2 | 11/2007 |

OTHER PUBLICATIONS

Zhou, Bing et al., CN115457580 A, published Dec. 9, 2022, English translation, 24 pages. (Year: 2022).*

(Continued)

*Primary Examiner* — Barbara M Level
(74) *Attorney, Agent, or Firm* — GrowIP Law Group LLC

(57) ABSTRACT

Embodiments of computer-implemented systems and methods for extracting tables from documents are described. Document layout data is generated based on a plurality of glyphs associated with document lines, comprising data identifying: a plurality of text segments within each line; a plurality of text segment links; a plurality of text blocks of one or more of the text segments; and a plurality of text block links. A document is generated including at least one editable document table corresponding to at least one document table identified based on the plurality of glyphs associated with document lines.

22 Claims, 12 Drawing Sheets

(56) References Cited

U.S. PATENT DOCUMENTS

| | | |
|---|---|---|
| 2021/0064861 A1 | 3/2021 | Semenov |
| 2022/0284175 A1 | 9/2022 | Schwiebert et al. |
| 2022/0284724 A1 | 9/2022 | Schwiebert et al. |
| 2022/0318224 A1* | 10/2022 | Thompson ............ G06V 30/414 |
| 2022/0318545 A1* | 10/2022 | Poff ..................... G06V 30/412 |

OTHER PUBLICATIONS

Liu, Y., "Tableseer: Automatic Table Extraction, Search, and Understanding", Dissertation, The Pennsylvania State University, Dec. 2009, pp. 1-171, URL: https://etda.libraries.psu.edu/files/final_submissions/6921.

* cited by examiner

```
Time: 12:05 PM                                    Title: list           ─ 1502
    Head 1                        Head 2                                ─ 1504
    1   Text 10     $110          6   Text 60    $160
    2   Text 20     $120          7   Text 70    $170
    3   Text 30     $130
    4   Text 40     $1,400        Head 3
    5   Text 50     $150          No   Title     Amount
                                  8    Text 80   $180                   ─ 1506
                                  9    Text 90   $190
                                  Total          $370

Page Number: 1
```

Figure 15

```
Time: 12:05 PM                                    Title: list           ─ 1502
    Head 1                        Head 2                                ─ 1604
    1   Text 10     $110          6   Text 60    $160
    2   Text 20     $120          7   Text 70    $170
    3   Text 30     $130
    4   Text 40     $1,400        Head 3
    5   Text 50     $150          No   Title     Amount
                                  8    Text 80   $180
                                  9    Text 90   $190                   ─ 1606
                                  Total          $370

Page Number: 1
```

Figure 16

```
Time: 12:05 PM                                    Title: list           ─ 1402
    Head 1                        Head 2                                ─ 1704
    1   Text 10     $110          6   Text 60    $160                   ─ 1504
    2   Text 20     $120          7   Text 70    $170
    3   Text 30     $130                                                ─ 1708
    4   Text 40     $1,400        Head 3
    5   Text 50     $150          No   Title     Amount
                                  8    Text 80   $180                   ─ 1706
                                  9    Text 90   $190                   ─ 1506
                                  Total          $370
                                                                        ─ 1710
                        Page Number: 1
```

Figure 17

SYSTEMS AND METHODS FOR EXTRACTING TABLES FROM DOCUMENTS

CROSS-REFERENCE TO RELATED APPLICATION

This application is a U.S. Non-Provisional Application that claims priority to Australian Patent Application No. 2024202305, filed Apr. 10, 2024, which is hereby incorporated by reference in its entirety.

FIELD

The present disclosure is directed to systems and methods for extracting tables from documents.

BACKGROUND

Electronic documents may be defined by data in various formats. Some formats, for example formats used by many document editors, are conducive to certain editing operations. Other formats are not. It is therefore often desirable to convert a document in a format that is not easily editable into a format that is easily editable.

A particular example of an editing operation is text editing. Documents may define glyphs and their positions, either natively or after a character recognition process has been performed. For example, the Portable Document Format (PDF) may present text as glyphs and positions. PDF is an open standard that facilitates exchange of documents while maintaining the appearance of the document.

Defining glyphs and their positions in a document does not provide structure information, such as a paragraph or a table. When a document with unstructured text contains a table, the text may be edited, but performing table operations is not readily achievable. An automated or semi-automated process to form structured data defining a table based on unstructured text would therefore be useful. However, computer-implemented methods for identifying tables from unstructured text present several challenges. For example, it can be challenging to design a process that detects text elements and identifies tables from unstructured documents like PDF with an acceptable level of accuracy.

SUMMARY

A computer-implemented method comprising: accessing data defining a plurality of glyphs, including data associating each of the plurality of glyphs with one of a plurality of document lines; generating document layout data based on the accessed data, comprising generating data identifying: a plurality of text segments within a said document line, each text segment encompassing a group of one or more of the plurality of glyphs; a plurality of text segment links; a plurality of text blocks of one or more of the text segments, wherein a said text block of two or more segments is formed based on one or more of the text segment links; and a plurality of text block links, identifying the contents of cells of at least one document table based on the document layout data; and generating in a document at least one editable document table corresponding to the at least one document table; wherein: each text segment link represents an association between two text segments and is generated based on an alignment of the two text segments; and each text block link represents an association between two text blocks and is generated based on an alignment of the two text blocks.

A computer-implemented method comprises: identifying from data of a first document, a plurality of blocks of text segments in the first document, wherein each block is identified based on a determination that a group of text segments of the document are adjacent each other and vertically and or horizontally aligned in a grid; identifying a plurality of table cells based on the plurality of blocks of text segments, each table cell comprising one or more blocks of text segments, wherein at least one table cell comprises a plurality of blocks of text segments and is identified based on a determination that a group of text blocks of the document are adjacent each other and vertically and or horizontally aligned in a grid; and determining neighbouring table cells and forming data defining a document table of the neighbouring table cells in a second document.

A computer system is also described that is configured to perform the methods described above.

Non-transitory computer readable memory is also described comprising instructions to cause a computer processor to perform the methods described above.

BRIEF DESCRIPTION OF THE DRAWINGS

Preferred embodiments of the invention will be described, by way of examples only, with reference to the accompanying representations, wherein:

FIGS. 15-17 depict an example process for identifying document lines.

DETAILED DESCRIPTION OF THE EMBODIMENTS

Figure 1:
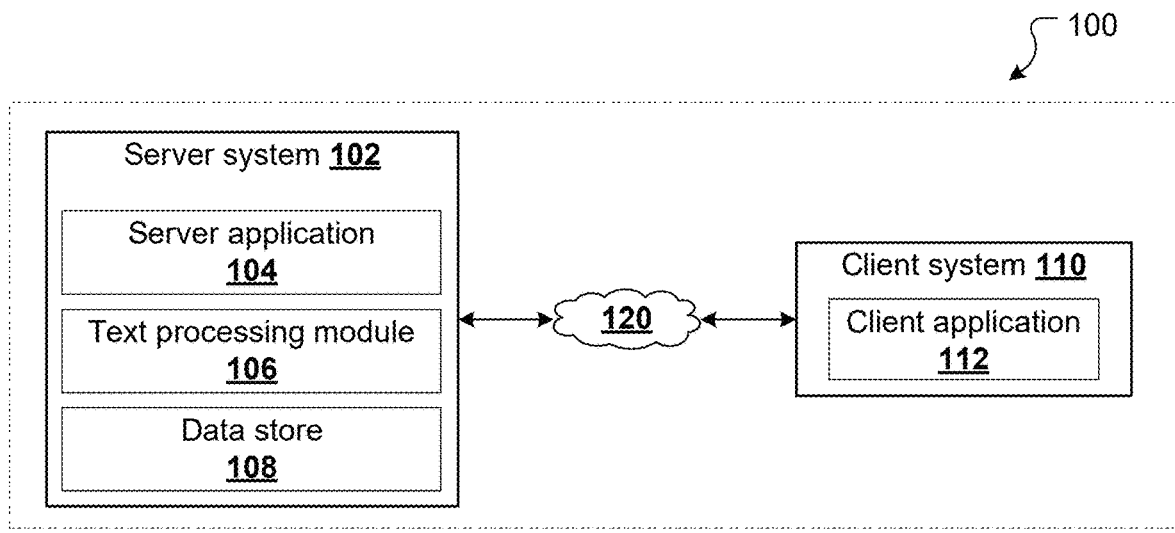
FIG. 1 is a diagram depicting a networked environment in which various features of the present disclosure may be implemented.

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

While the systems and methods disclosed herein are applicable to identifying tables in documents in general, the following description is made primarily with reference to the Portable Document Format (PDF). Such references to the PDF are not to be taken as limiting the described systems and methods to any particular type of document.

The PDF is a common format for storing and sharing content. The PDF is standardised and described in ISO 32000 (e.g. ISO 32000-2). In many situations, users may wish to import content formatted as PDF data into an editing application so that content can be more readily edited.

Consider, for example, a PDF document may contain data that, when rendered by a PDF viewer application, is visually presented as a table with distinct rows and columns. However, when importing such a PDF document into an editor application, creating an accurate representation of the table is challenging, given the PDF data is such that each text character is stored separately and individually (e.g., as an individual glyph or grapheme cluster). Additionally, the table separator lines, both vertical and horizontal, may not assist in categorising the glyphs, for example because these lines may be represented as vector graphics, separate from the text data within the PDF data. This means that the separator lines themselves do not inherently carry information about the structure of a document (e.g., organisation of glyphs within the cells of a table).

As a result, much of what will be referred to as the contextual data concerning the text is not expressly defined in the PDF data—e.g., there is not data defining table rows and columns, content of table cells, alignment of table cells, lines/line breaks, paragraph/paragraph breaks, empty lines, etc.

When a user imports PDF data of a PDF page into an editing application, the result will depend on how the application in question processes the PDF data. For example, if the PDF data includes certain content representing a table with a number of rows and columns containing textual data as described above, the imported data into the editing application may not completely and accurately represent the table as rendered in a PDF viewer application or as it was originally represented in the application that created the PDF page. For example, textual data of some cells may be inaccurate or incomplete, number of rows and columns may not match the original table, or alignment of textual data in table cells may not be correct.

From a user perspective, this may provide an inefficient and frustrating editing experience. If a user wishes to edit any of the elements within the imported table, they will have to also manually adjust the table to rectify the issues caused by the importing process (e.g., correcting the number of rows and columns, alignment of textual data, and cell contents).

Aspects of the present disclosure are generally directed to methods for extracting tables from documents.

The techniques and features of the present disclosure will be described in the context of importing PDF data into an editable document. The editable document may be any appropriate editable document, for example a design document (rendered and edited by a design application), a word processing document (rendered and edited by a word processing application), or any other appropriate document type that is suitable to define a table.

FIG. 1 depicts one example of a networked environment 100 in which the various operations and techniques described herein can be performed.

The networked environment 100 includes a server system 102 and a client system 110 that are interconnected via one or more communications networks 120 (e.g., the Internet). While a single client system 110 is illustrated and described, the server system 102 will typically serve multiple client systems 110.

The server system 102 includes various functional components which operate together to provide server-side functionality.

One component of server system 102 is a front-end server application 104. The server application 104 is executed by a computer processing system to configure the server system 102 to provide server-side functionality to one or more corresponding client applications (e.g., the client application 112 described below). The server-side functionality includes operations such as user account management (where required), login (where required), and receiving and responding to client requests (e.g., API requests, remote procedure calls, etc.).

The server system 102 may provide a range of services/functions related to editable documents (e.g. designs) and as such may provide (alone or in conjunction with the client application 112) functions such as document creation, document editing, document saving, document sharing/publication, and/or other relevant functions. Alternatively, the server system 102 may be substantially dedicated to providing a service according to the operations and techniques described herein.

To provide the server-side functionality, the server application 104 comprises one or more application programs, libraries, application programming interfaces (APIs), or other software elements. For example, where the client application 112 is a web browser, the server application 104 will be a web server such as Apache, IIS, nginx, GWS, or an alternative web server. Where the client application 112 is a native application, the server application 104 may be an application server configured specifically to interact with that client application 112. The server system 102 may be provided with both web server and application server.

In the present example, the server system 102 also includes a text processing module 106 which is described further below. Throughout this disclosure the text processing module 106 will be referred to as the TPM 206.

The server system 102 also includes a data store 108, which is used to store various data required by the server system 102 in the course of its operations. Such data may include, for example, user account data, document template data, data in respect of documents that have been created or imported by users, and/or other data. While one data store 108 is depicted, the server system 102 may include/make use of multiple separate data stores—e.g., a user data store (storing user account details), one or more element library data stores (storing elements that users can add to documents being created); a template data store (storing templates that users can use to create documents); a documents data store (storing data in respect of documents that have been created); and/or other data stores.

In order to provide server-side functionality to clients, the server system 102 will typically include additional functional components to those illustrated and described. As one example, the server system 102 will typically include one or more firewalls (and/or other network security components) and load balancers (for managing access to the server application 104).

The server system 102 components have been described as functional components, and may be implemented by hardware, software (data and computer readable instructions which are stored in memory and executed by one or more computer processing systems), and/or a combination of hardware and software.

The precise hardware architecture of the server system 102 will vary depending on implementation, however, it may well include multiple computer processing systems (e.g., server computers) which communicate with one another either directly or via one or more networks, e.g., one or more LANS, WANs, or other networks (with a secure logical overlay, such as a VPN, if required).

For example, a single server application 104 may run on a single, dedicated server computer and a data store 108 may run on a separate server computer (with access to appropriate data storage resources). As an alternative example, the server system 102 may be configured to provide multiple server applications 104 which are executed on appropriate hardware resources and commissioned/decommissioned based on user demand. In this case, there may be multiple server computers (nodes) running multiple server applications 104 which service clients via a load balancer.

The client system 110 hosts a client application 112 which, when executed by the client system 110, configures the client system 110 to provide client-side functionality for the server application 104 of the server system 102. Via the client application 112, a user can interact with the server application 104 in order to perform various operations such as those described herein.

The client application 112 may be a web browser application (such as Chrome, Safari, Internet Explorer, Opera, or an alternative web browser application) which accesses the server application 104 via an appropriate uniform resource locator (URL) and communicates with server application 104 via general world-wide-web protocols (e.g. http, https, ftp). Alternatively, the client application 112 may be a native application programmed to communicate with the server application 104 using defined application programming interface (API) calls.

The client system 110 may be any computer processing system which is configured (or configurable) by hardware and/or software to offer client-side functionality. By way of example, the client system 110 may be a desktop computer, a laptop computer, a netbook computer, a tablet computing device, a mobile/smartphone device, a personal digital assistant, or an alternative computer processing system.

Although not illustrated in FIG. 1, the client system 110 will typically have additional applications installed thereon, for example, at least an operating system application such as a Microsoft Windows operating system, an Apple macOS operating system, an Apple iOS operating system, an Android operating system, a Unix or Linux operating system, or an alternative operating system.

As previously mentioned, in the example environment 100, the server system 102 includes a text processing module (TPM) 106. The TPM 106 is a software module that includes instructions and data for performing the various operations described herein.

While the TPM 106 has been depicted and described as distinct to the server application 104, the functionality provided by the TPM 106 could be provided by the server application 104 (i.e. by the server application 104 itself including relevant instructions and data to perform the processing that is described as being performed by the TPM 106).

In alternative implementations, the TPM 106 could be provided at the client system 110—e.g. as a stand-alone application in communication with the client application 112, a plug-in/add-on/extension to the client application 112, or an integral part of the client application 112.

In still further implementations, the functionality described as being performed by the TPM 106 could be distributed between multiple systems (e.g., the client system 110 and the server system 102).

The features and techniques described herein are implemented using one or more computer processing systems.

For example, in the networked environment 100 described above, the client system 110 is a computer processing system (for example a personal computer, tablet/phone device, or other computer processing system). Similarly, the various functional components of the server system 102 are implemented using one or more computer processing systems (e.g., server computers or other computer processing systems).

Figure 2:
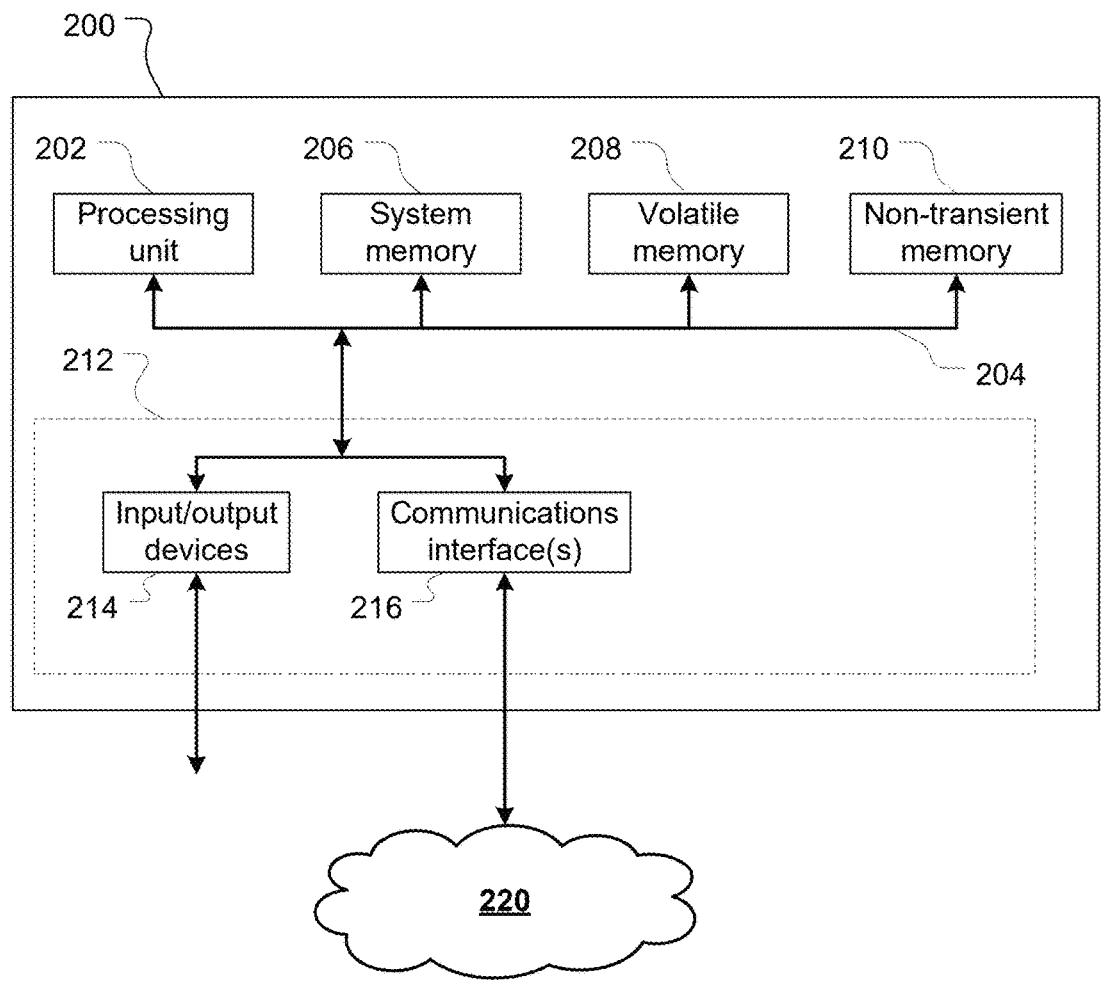
FIG. 2 is a block diagram of a computer processing system configurable to perform various features of the present disclosure.

FIG. 2 provides a block diagram of an example computer processing system 200 configurable to implement embodiments and/or features described herein. System 200 is a general-purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function, all processing required to perform that operation or function will be performed by processing unit 202. In other instances, processing required to perform that operation or function may also be performed by remote processing devices accessible to and usable by (either in a shared or dedicated manner) system 200.

Through a communications bus 204, the processing unit 202 is in data communication with a one or more machine readable storage (memory) devices which store instructions and/or data for controlling operation of the processing system 200. In this example, system 200 includes a system memory 206 (e.g. a BIOS), volatile memory 208 (e.g. random-access memory, such as one or more DRAM modules), and non-volatile or non-transitory memory 210 (e.g. one or more hard disk or solid-state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Generally speaking, and depending on the particular system in question, devices to which system 200 connects—whether by wired or wireless means—include one or more input and output devices 214, to allow data to be input into/received by system 200 for processing by the processing unit 202, and to allow data to be output by system 200. Example devices are described below, however, it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as display devices, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 also includes one or more communications interfaces 216 for communication with a network 220, which may be the network 120 of environment 100 (and/or a local network within the server system 102 or OS). Via the communications interface(s) 216, system 200 can communicate data to and receive data from networked devices, which may themselves be other computer processing systems.

System 200 may be or form part of any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (or software modules)—i.e., computer readable instructions and data which, when executed by the processing unit 202, configure system 200 to receive, process, and output data. Instructions and data can be stored on non-transitory machine readable medium accessible to system 200. For example, instructions and data may be stored on non-transitory memory 210. Instructions and data may be transmitted to/received by system 200 via a data signal in a transmission channel enabled (for example) by a wired or wireless network connection over an interface such as 212.

Applications accessible to system 200 will typically include an operating system application. System 200 also stores or has access to applications which, when executed by the processing unit 202, configure system 200 to perform various computer-implemented processing operations described herein. For example, and referring to the networked environment of FIG. 1 above: client system 110 includes a client application 112 which configures the client system 110 to perform the operations described herein.

In some cases, part or all of a given computer-implemented method will be performed by system 200 itself, while in other cases processing may be performed by other devices in data communication with system 200.

Figure 3:
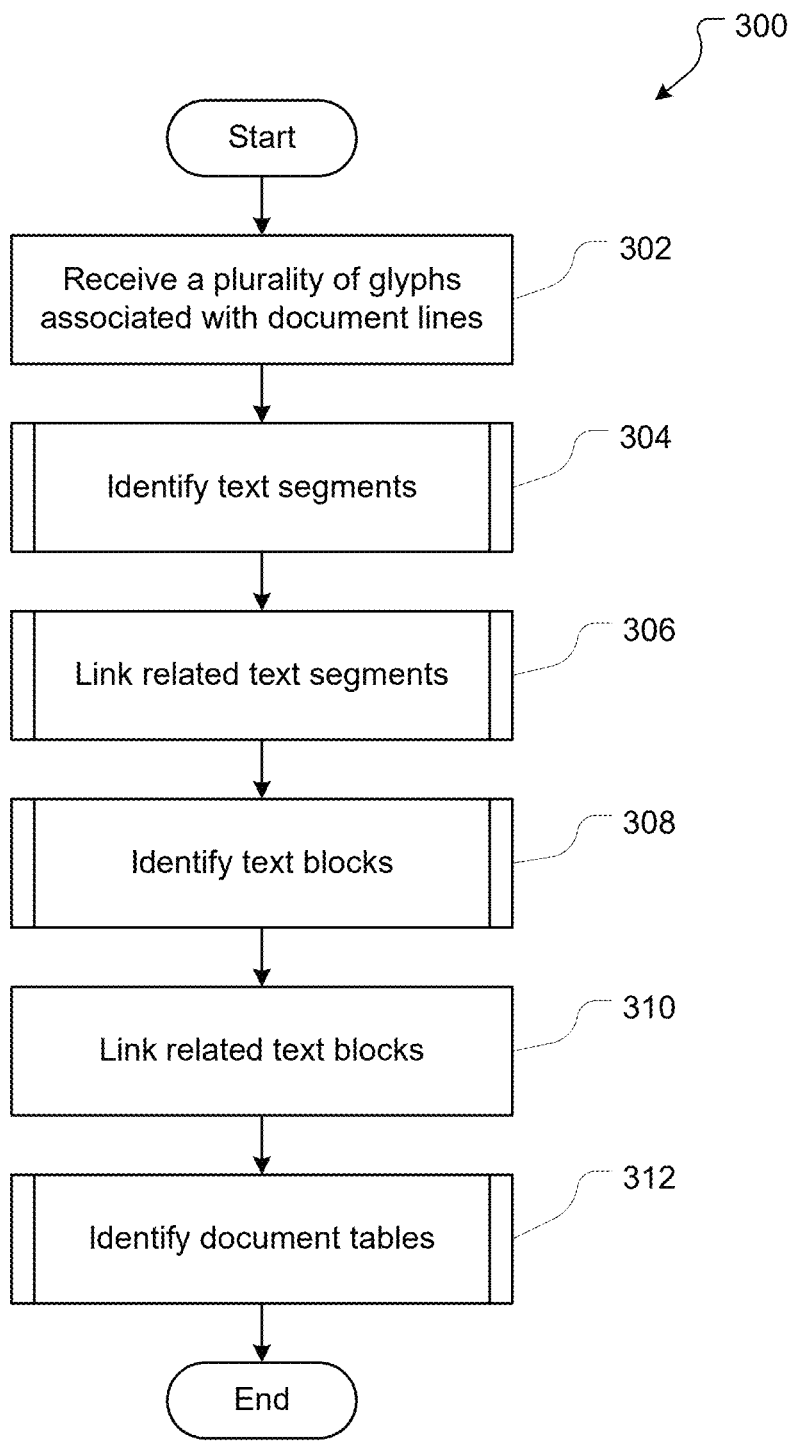
FIG. 3 depicts operations performed for importing tables from a document.

FIG. 3 shows a flowchart of a method 300. The method may be performed as or as part of a table import process. Accordingly, the method of FIG. 3 is herein called a table import process 300. The table import process 300 may be performed by a computer processing system, such as the computer processing system 200 (see FIG. 2). In a particular example, the processing is performed by the text processing module (TPM) 106 (see FIG. 1) and this example is adopted in the following description. However, processing could be performed by an alternative module, application, or group of modules/applications.

Operations of the table import process 300 are described in the context of PDF text data. The operations can, however, be adapted to apply to other documents.

At step 302, the TPM 106 receives a plurality of glyphs contained in a PDF document page wherein each glyph in the plurality of glyphs is associated with a document line in the PDF document page and with glyph position data defining the position of the glyph on the document page. This may, for example, be in response to a user of client application 112 importing or otherwise selecting (e.g., by copying and pasting) PDF text data.

Associating glyphs included in PDF data and document lines may be carried out through a variety of methods. In one example, an optical character recognition (OCR) process may have been completed, with the output of the OCR process comprising data defining the glyphs and data defining document lines containing the glyphs. An example method is described later in this disclosure in relation to FIGS. 14-16.

In the following steps, the TPM 106 will generate document layout data (steps 304 to 310) and then identify document tables (step 312). Document layout data identifies the text segments, text segment links, text blocks, and text block links.

At step 304, the TPM 106 identifies text segments, each text segment made up of or containing one or more glyphs. In some embodiments sweep line algorithm is used to merge text glyphs that are close together on a line. Each document line may be considered and text segments may be identified by determining that text glyphs are located in the line close together. Similarly, a split of text into two segments may be identified by adjacent text glyphs in the line being spaced apart beyond a threshold distance. The threshold distance may be fixed or may vary depending on the document, for example a larger distance threshold may be used for a larger font size of text. Each text segment is associated with a bounding box that contains the identified text segment. An example process for identifying text segments is described in relation to process 400 below.

At step 306, the TPM 106 builds links between text segments based in part on the alignment of their bounding boxes, either vertically or horizontally. In some embodiments a segment is aligned vertically with another segment if any of that segment's left edge, centre line, or right edge aligns with the left edge, centre line or right edge respectively of its closest vertical neighbour. Similarly, two horizontally neighbouring segments are aligned horizontally if any of their top edges, middle lines, or bottom edges align.

In some embodiments the linking process connects segments left to right and top to bottom. For example, the linking process may loop through the segments starting from the leftmost segment in the top line. The vertically and horizontally closest segments are identified, to determine any valid links with the segment below and the segment to the right respectively. In the next loop, the second leftmost segment in the top line (if any) is considered for any valid link vertically downwards and to the right. Once all segments in the top line have been considered the leftmost segment in the next line below the top line are considered, again looking downwards and to the right for valid links. The loop continues until all the segments have been considered for potential valid linkage.

An example of this linking process is described in relation to process 500 below.

At step 308, the TPM 106 identifies text blocks based on the text segments and the linkages identified in step 306. The TPM 106 iterates through all the text segments, for example in a depth first search that follows the linkages between vertically aligned segments (as described with reference to step 306). If a closest neighbouring segment to the segment being considered in the current iteration meets a set of one or more conditions, then the two segments are associated with or merged into the same text block. The conditions may avoid forming a text block from two segments when one of those segments intersects a third segment horizontally. Other conditions in relation to the text attributes may be included, for example that the text has the same rotation.

An example of a process to identify text blocks is described in relation to process 800 below. Each text block has a bounding box that encompasses the bounding boxes of the segments associated with it.

At step 310, the TPM 106 builds links between text blocks, herein referred to as text block links, based in part on the alignment of their bounding boxes, either vertically or horizontally. In some embodiments a text block is aligned vertically with another text block if any of that text block's left edge, centre line, or right edge aligns with the left edge, centre line or right edge respectively of its closest vertical neighbour. Similarly, two horizontally neighbouring text blocks are aligned horizontally if any of their top edges, middle lines, or bottom edges align. The process of step 310 to build text block links between text blocks may be the same as the process of step 306 to build segment links between text segments. The description of linking segments, including the process 500 of FIG. 5 therefore applies to linking text blocks, with the references to text segments and segment links respectively replaced by references to text blocks and text block links. Accordingly, at the conclusion of step 310, the TPM 106 completes the generation and storing of data representing text block links. In some embodiments, the TPM 106 stores this information as an acyclic directed graph wherein text block links are represented by graph edges and text blocks are represented by graph nodes.

At step 312, the TPM 106 identifies document tables based in part on the segment links created at step 310. An example of a process to identify document tables is described in relation to process 1100 below.

Figure 4:
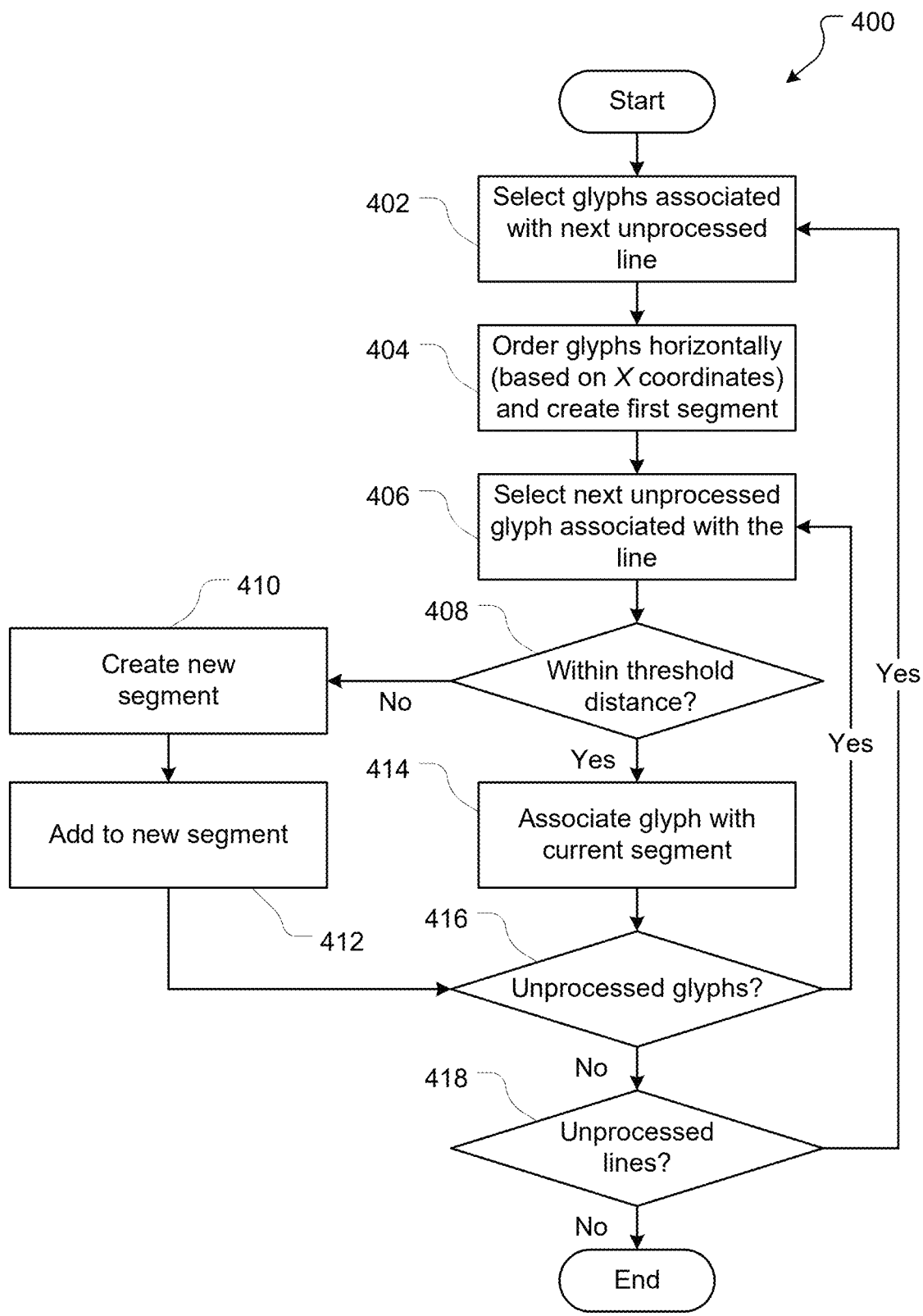
FIG. 4 depicts operations performed for identifying text segments from document lines.

Turning to FIG. 4, a process 400 will be described to identify text segments. Processing is described as being performed by the text processing module (TPM) 106, however processing could be performed by an alternative module, application, or group of modules/applications.

At step 402, the TPM 106 commences the process by selecting the first set of glyphs associated with a single document line for processing. These glyphs are selected from the collection of glyphs previously received at step 302 of method 300.

At step 404, the TPM 106 orders the set of glyphs selected at step 402. The set of glyphs are ascendingly ordered based on the left X value of each glyph included in glyph position data. Accordingly, this ordering will result in a set of glyphs wherein the first glyph is the left-most glyph associated with a line and the last glyph is the right-most glyph associated with the same line. The first glyph is associated with a first segment for the line.

At step 406, the TPM 106 selects a next glyph from the ordered set of glyphs for processing. Accordingly, the selection starts with the second glyph and progresses through the ordered set of glyphs with each repeat of step 406.

At step 408, the TPM 106 determines whether the glyph selected at step 406 is within a threshold distance of the last glyph considered, or equivalently within a threshold distance of a rightmost edge of the current text segment (where the current segment is the segment to which the previously considered glyph was added to). If yes, at step 414 the TPM 106 associates the glyph with the current text segment.

As noted above, at step 408 the TPM 106 determines whether the glyph is within a threshold distance from the glyphs associated with the text segment. This determination may be made using a variety of different methods. In one embodiment a sweep line algorithm may be used to make this determination. In a different embodiment, a fixed threshold value may be used which may vary depending on the height of the glyphs or on an identified font of the glyph or otherwise. It will be appreciated that in other embodiments one or a combination of different methods may be used.

If at step 408 the TPM 106 determines that the glyph is not within the threshold distance, then at step 410 the TPM 106 creates a new text segment and at step 412 the TPM 106 adds the glyph to the segment glyph set of the newly created text segment. The newly created text segment is deemed the current segment for the purposes of any subsequent performance of steps 408 and 414.

At step 416, the TPM 106 determines whether there are any glyphs from the set of glyphs previously selected at step 402 which are yet to be processed. If such glyphs exist, the process moves to step 406 wherein the next unprocessed glyph is selected for processing. On the other hand, if no such unprocessed glyph exists, the process moves to step 418.

At step 418, the TPM 106 determines whether the glyphs associated with any other document line are yet to be processed. If such glyphs exist, the control moves to step 402 wherein glyphs associated with the next unprocessed line are selected for processing. On the other hand, if no such unprocessed glyphs exist, the process 400 concludes.

Figure 5:
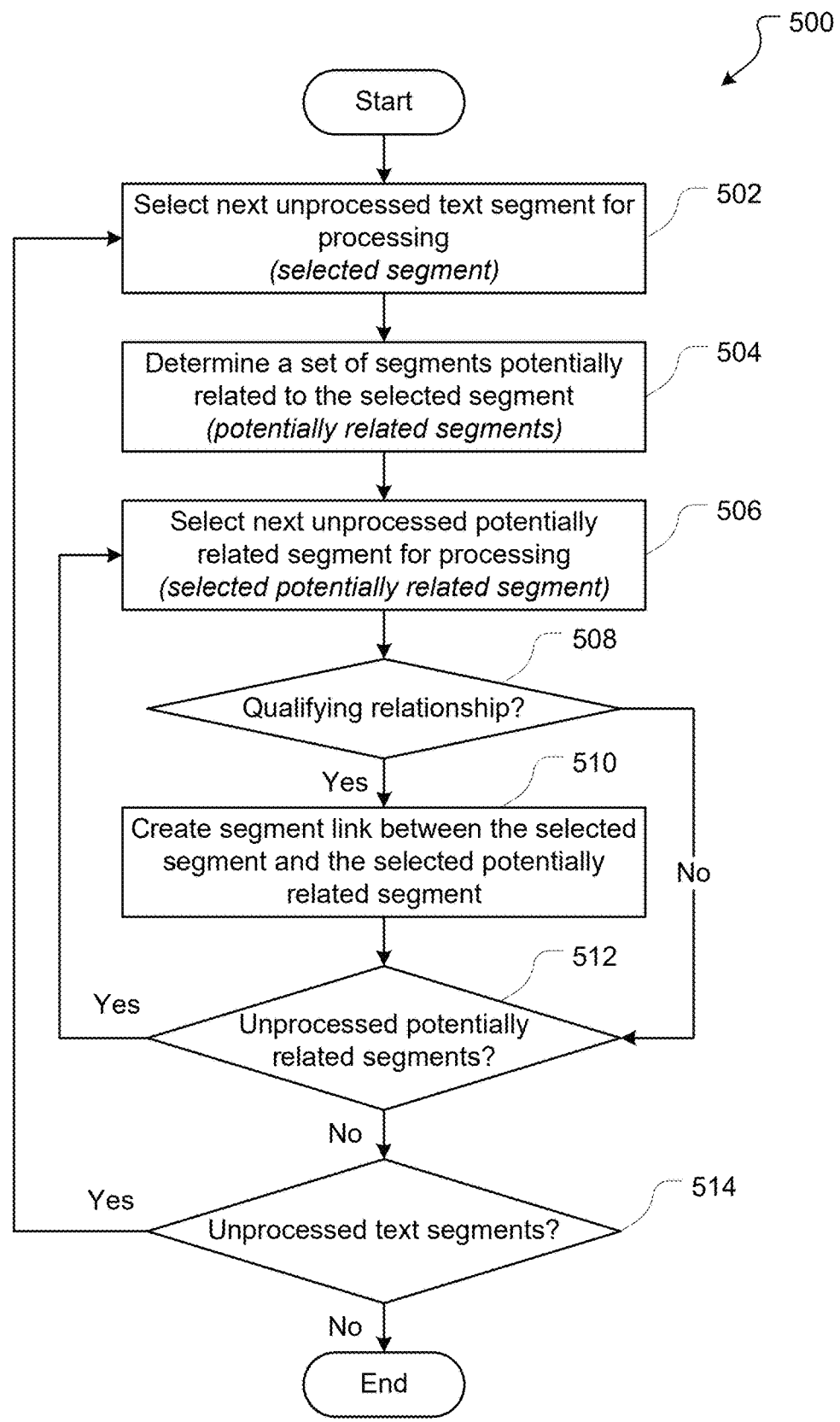
FIG. 5 depicts operations performed for linking related text segments.

Turning to FIG. 5, a process 500 will be described to build links between potentially related text segments. Processing is described as being performed by the text processing module (TPM) 106, however processing could be performed by an alternative module, application, or group of modules/applications.

At step 502, the TPM 106 selects a next unprocessed text segment for processing. In describing the process 500, this text segment is referred to as the selected segment. As described above, in some embodiments the selection is in the order of top left to bottom right.

At step 504, the TPM 106 determines a set of text segments that are candidates for linkage. In describing the process 500, these text segments are referred to as potentially related text segments. In one embodiment, potentially related text segments are text segments which align vertically or horizontally with the selected segment.

A vertical alignment may exist, for example, where a text segment has any of a left X value, a centre X value, or a right X value that matches that of the selected segment. In other words, if a text segment aligns on the left boundary, the centre of the left and the right boundaries, or the right boundary with the corresponding boundary of the selected segment, the two segments may be considered to have a vertical alignment.

A horizontal alignment exists, for example, where a text segment has a top Y value, a middle Y value, or a bottom Y value that matches that of the selected segment. In other words, if a text segment aligns on the top boundary, the middle of the top and the bottom boundaries, or the bottom boundary with the corresponding boundary of the selected segment, the two segments may be considered to have a horizontal alignment.

In some embodiments the alignments of the boundaries are considered independently and for each boundary the potentially related text segment is the closest segment aligned on that boundary. Accordingly, up to three potentially related text segments are identified from the vertically aligned text segments and up to three potentially related text segments are identified from the horizontally aligned text segments. Depending on the relative location of the segments, zero, one, two or three potentially related text segments may be identified in each direction.

At step 506, the TPM 106 selects the next unprocessed potentially related text segment from the potentially related segments for processing. In describing the process 500, this text segment is referred to as the selected potentially related segment.

At step 508, the TPM 106 determines whether a qualifying segment relationship exists between the selected segment and the selected potentially related segment. A qualifying segment relationship exists if one or more conditions are satisfied.

For example, if the selected segment and the selected potentially related segment are vertically aligned, to assess the existence of a qualifying segment relationship the TPM 106 may determine that the top Y (top boundary) of the selected segment is positioned higher than the top Y (top boundary) of the selected potentially related segment (i.e., SelectedPotentiallyRelatedSegment.TopY<SelectedSegment.TopY). If not, this condition is not met and there is not a qualifying segment relationship.

In another example, the TPM 106 may consider such closest vertically aligned text segment to have a qualifying segment relationship with the selected segment only if there is no other third text segment vertically between the selected segment and the selected potentially related segment, which horizontally intersects with the selected segment or the selected potentially related segment. A horizontal intersection exists where a vertical line can be drawn intersecting either the selected segment and the selected potentially related segment, or the selected segment and the third text segment, or all the three segments.

Figure 6:
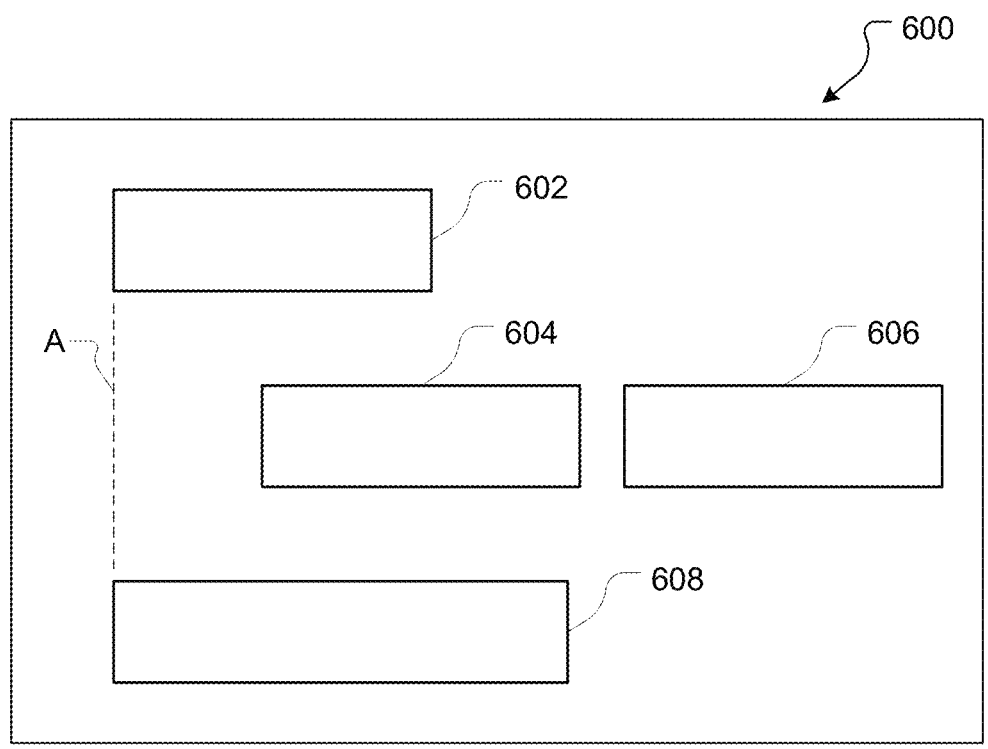
FIGS. 6-7 depict example horizontal and vertical intersections between text segments.

An example of a horizontal intersection is shown in page 600 of FIG. 6. The page 600 contains four text segments: a selected segment 602, an intersecting segment 604 (third segment, as above), a non-intersecting segment 606, and a selected potentially related segment 608. As shown by the dotted guide line A, the selected segment 602 and the potentially related segment 608 are vertically aligned based on their left boundaries. However, these two text segments do not have a qualifying segment relationship because the segment 604 has a horizontal intersection with the segments 602 and 608.

As mentioned, the segment 606 does not have such a horizontal intersection with the segments 602 and 608. Therefore, in another example of page 600, one which did not contain the segment 604 (i.e., if only the segments 602, 606 and 608 existed), then segments 602 and 608 would have a qualifying segment relationship as described in relation to the step 508 of the method 500.

Returning to step 508 of method 500, as another example, if the selected segment and the selected potentially related segment are horizontally aligned, to assess the existence of a qualifying segment relationship the TPM 106 may determine that the left X (left boundary) of the selected segment is positioned to the left of the left X (left boundary) of the selected potentially related segment (i.e., SelectedPotentiallyRelatedSegment.LeftX<SelectedSegment.LeftX). If not, this condition is not met and there is not a qualifying segment relationship.

In another example, the TPM 106 may consider such closest horizontally aligned text segment to have a qualifying segment relationship with the selected segment only if there is no other text segment horizontally between the selected segment the selected potentially related segment, which vertically intersects with the selected segment or the selected potentially related segment. A vertical intersection exists where a vertical line can be drawn intersecting either the selected segment and the selected potentially related segment, or the selected segment and the third text segment, or all the three segments.

Figure 7:
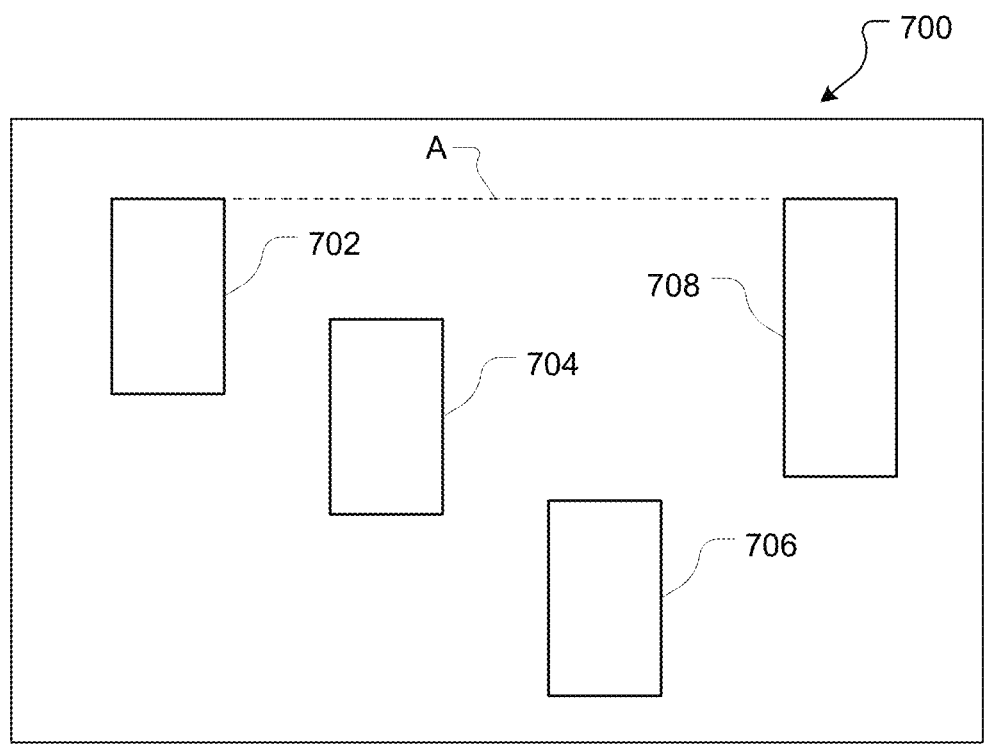

An example of the vertical intersection is shown in page 700 of FIG. 7. The page 700 contains four text segments: a selected segment 702, an intersecting segment 704 (third segment, as above), a non-intersecting segment 706, and a selected potentially related segment 708. As shown by the dotted guide line A, the selected segment 702 and the potentially related segment 708 are horizontally aligned based on their top boundaries. However, these two segments do not have a qualifying segment relationship because the segment 704 has a vertical intersection with the segments 702 and 708. If the page 700 did not contain the segment 704 (i.e., if only the segments 702, 706 and 708 existed), then segments 702 and 708 would have a qualifying segment relationship as described in relation to the step 508 of the method 500.

If the TPM 106 determines at step 508 that a qualifying segment relationship exists between the selected segment and the selected potentially related segment, the control moves to step 510. Otherwise, the control moves to step 512.

At step 510, the TPM 106 creates a segment link between the selected segment and the selected potentially related segment. The TPM 106 records the creation of this link by generating and storing data representing the link.

It will be appreciated that the TPM 106 may use various data structures to store and represent segment links. In some embodiments, the TPM 106 stores segment links as edges of an acyclic directed graph wherein each of the graph nodes is a text segment. In other embodiments, other data structures may be used to store and represent segment links (e.g., arrays or lists or one or more fields within a data structure defining the segment).

At step 512, the TPM 106 determines whether any potentially related segment is yet to be processed. If it is determined that such a segment exists, the control moves back to step 506 wherein the next unprocessed potentially related segment is selected for processing. On the other hand, if the TPM 106 determines that no such unprocessed potentially related segment exists, then the control moves to step 514.

At step 514, the TPM 106 determines whether any text segment is yet to be processed. If it is determined that such a text segment exists, the control moves back to step 502 wherein the next unprocessed text segment is selected for processing. On the other hand, if the TPM 106 determines that no such unprocessed text segment exists, then the method 500 concludes.

At the conclusion of the method 500, the TPM 106 completes the generation and storing of data representing segment links. As noted earlier, in some embodiments the TPM 106 stores this information as an acyclic directed graph.

Figure 8:
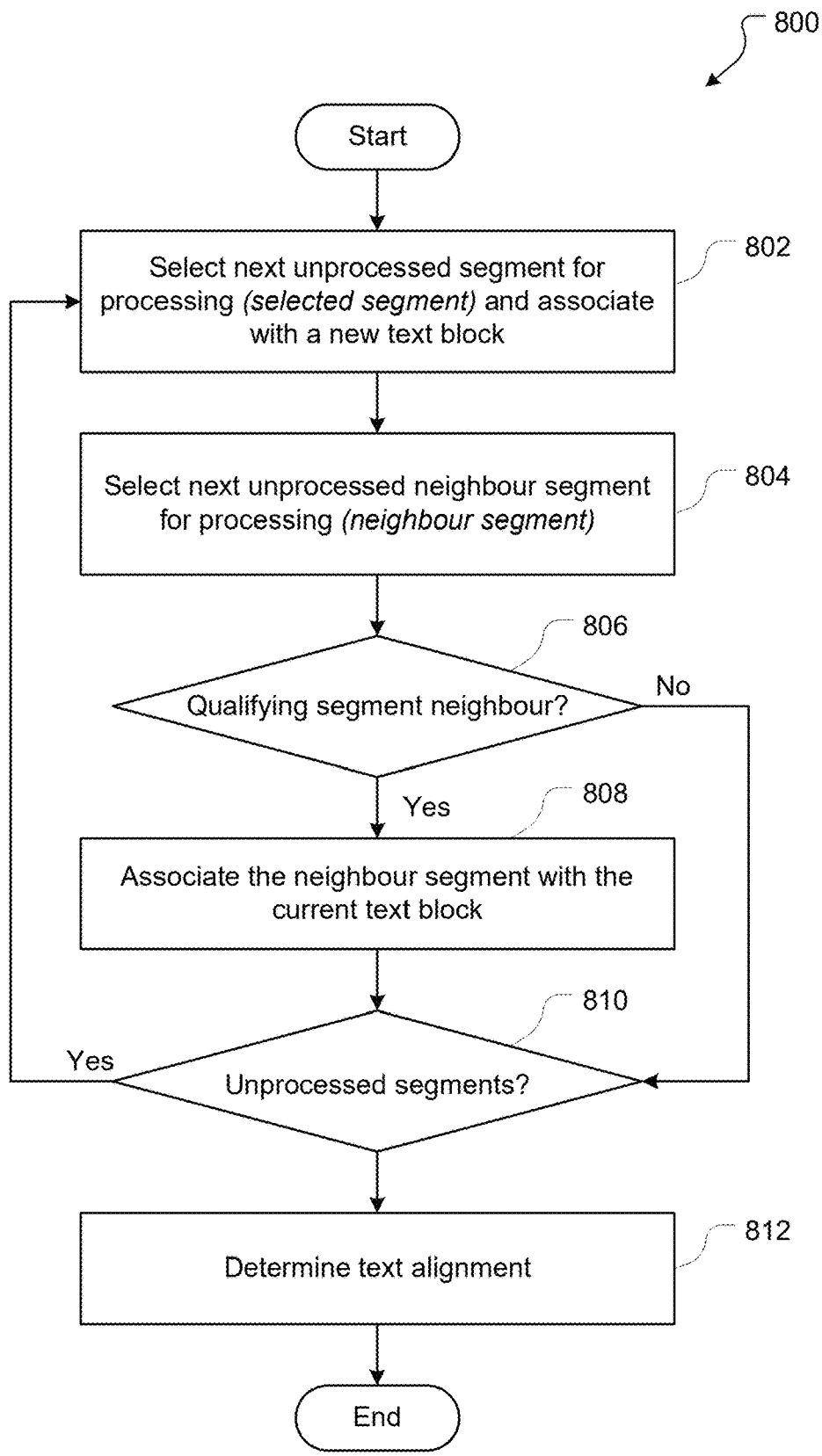
FIG. 8 depicts operations performed for identifying text blocks.

Turning to FIG. 8, a process 800 will be described to identify text blocks from text segments and segment links. A text block is formed from or contains or is associated with a set of one or more text segments. For clarity of illustration, the term "associated with" is used to generally describe this relationship. Process 800 identifies which text segments are associated with each text block. Processing is described as being performed by the text processing module (TPM) 106, however processing could be performed by an alternative module, application, or group of modules/applications.

At step 802, the TPM 106 selects a next unprocessed text segment for processing. In describing the process 800, this text segment is referred to as the selected segment. The selected segment is assigned to a new text block.

The TPM 106 may select a next text segment for processing using a variety of methods. In some embodiments, the TPM 106 uses a depth-first search algorithm to select a next text segment for processing based on following the vertical edges only.

At step 804, the TPM 106 selects a next unprocessed neighbour segment for processing. As described earlier, in one embodiment, a segment may have up to three established segment links to up to three other vertically aligned segments. In one embodiment, where there are links to two or three other segments, the TPM 106 selects a next unprocessed neighbour segment as the neighbour with the shortest vertical distance (i.e., the length of the vertical segment link) to the selected segment.

At step 806, the TPM 106 determines if the neighbour segment is a qualifying segment neighbour to the selected text segment for association with the text block created in step 802. The TPM 106 may consider various conditions or a combination of two or more conditions in reaching this determination. Some example conditions are provided below.

In some embodiments, the TPM 106 determines whether the selected segment and the neighbour segment have the same text rotation. For example, if the selected segment does not have a rotation (i.e., rotation angle=0°) whereas the neighbour segment has a rotation (e.g., rotation angle=45°), then the TPM 106 may disqualify the neighbour segment. In some implementations the rotation angle must be equal for the neighbour segment to be a qualifying segment neighbour to the selected text segment. In other implementations the rotation angle must be within a threshold rotation, for example within 2 degrees, for the neighbour segment to be deemed to have the same text rotation and be a qualifying segment neighbour to the selected text segment.

In some embodiments, the TPM 106 considers the positioning of the text segments horizontally neighbouring the neighbour segment. For example, the TPM 106 may consider whether a segment horizontally linked to the neighbour segment vertically intersects with the selected segment. A vertical intersection exists where a third text segment (i.e., the segment horizontally linked to the neighbour segment) is positioned horizontally between the selected segment and the neighbour segment and a section of the horizontal boundaries of the segments intersect. This condition for a qualifying segment neighbour is satisfied if there is not a vertical intersection.

Figure 9:
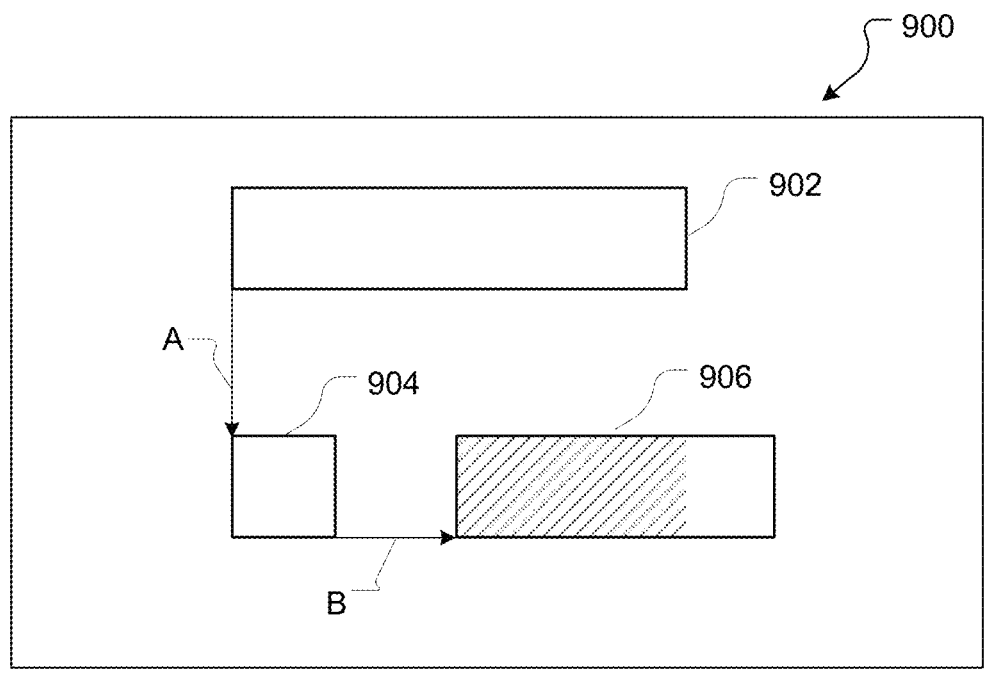
FIGS. 9-10 depict example horizontal and vertical intersections between segment neighbours.

An example of such intersection is shown in page 900 of FIG. 9. The page 900 contains three text segments, which as described above may be connected in an acyclic directed graph: a selected segment 902 (selected in step 802), which is connected with a graph edge A to a neighbour segment 904 (selected in step 804), which, in turn, is connected with a graph edge B to another segment 906. In this example, the TPM may determine that the segment 904 is not a qualifying segment neighbour due to the vertical intersection that exists between a part of the segment 906 (shown with hatching lines) and the selected segment 902.

In some embodiments, the TPM 106 considers the positioning of the text segment horizontally neighbouring the selected segment. For example, the TPM 106 may consider whether a segment horizontally linked to the selected segment vertically intersects with the neighbour segment. This condition for a qualifying segment neighbour is satisfied if there is not a vertical intersection.

Figure 10:
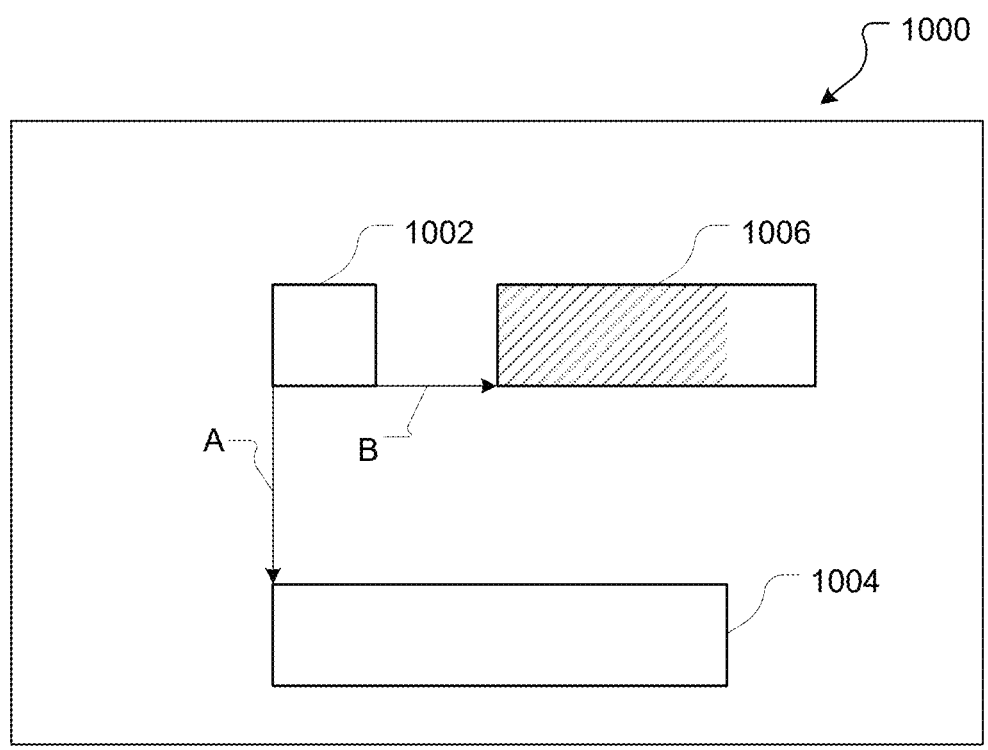

An example of such intersection is shown in page 1000 of FIG. 10. The page 1000 contains three text segments, which are connected in an acyclic directed graph: a selected segment 1002 (selected in step 802), which is connected with a graph edge A to a neighbour segment 1006 (selected in step 804) and with a graph edge B to a neighbour segment 1006. In this example, the TPM may determine that the segment 1004 is not a qualifying segment neighbour due to the vertical intersection that exists between a part of the segment 1006 (shown with hatching lines) and the neighbour segment 1004.

The TPM 106 may determine the presence or absence of a vertical intersection based on comparison with a threshold overlap. In some examples, the threshold overlap is zero, that is the segments must be spaced apart so the rightmost edge of one segment is to be left of the leftmost edge of the other segment. In other examples a small overlap may still be determined as no vertical intersection.

In some embodiments, the TPM 106 considers the vertical distance between the selected segment and the neighbour segment. For example, the TPM 106 determines that a neighbour segment is not a qualifying segment neighbour if the vertical distance between the selected segment and the neighbour segment exceeds a predefined threshold and otherwise that this condition for a qualifying segment neighbour is satisfied.

It will be appreciated that the TPM 106 may use a variety of methods to determine the distance between the two segments. For example, the TPM 106 may determine a neighbour segment not to be a qualifying segment neighbour if NeighbourSegment.BottomY−SelectedSegment.BottomY>N. In other embodiments, the TPM 106 may use other methods.

If at step 806 the TPM 106 determines that the neighbour segment is a qualifying segment neighbour due to meeting the one or more conditions or, for example, all of the conditions described above, the process moves to step 808. Otherwise, the process moves to step 810.

At step 808, the TPM 106 associates the neighbour segment with the current created text block, which is the new text block of step 802.

At step 810, the TPM 106 determines if an unprocessed segment exists for processing. If such an unprocessed segment exists, the control moves to step 802 where the next segment is selected for processing and associated with a new text block (which becomes the current text block for the next iteration of step 808. On the other hand, if no such unprocessed segments exist, the control proceeds to step 812.

At step 812, the TPM 103 determines text alignment associated with each text block based on the links between the segments associated with the text block. If the links between the segments associated with a text block are based on alignment of left boundaries of the segments, then the text alignment of the corresponding text block is set to left-aligned. The text block may also be left aligned if the links between the segments are based on both the left and centre boundaries. Similarly, if the links between the segments associated with a text block are based on alignment of centre or right (or right and centre) boundaries of the segments, then the text alignment of the corresponding text block is set to centre-aligned or right-aligned respectively. If the links between the segments associated with a text block are based on alignment of all three of the left, centre and right or on both the left and the right boundaries, then the text alignment of the corresponding text block is set to justified.

At the conclusion of the method 800, the TPM 106 completes the generation and storing of data representing the text blocks.

Figure 11:
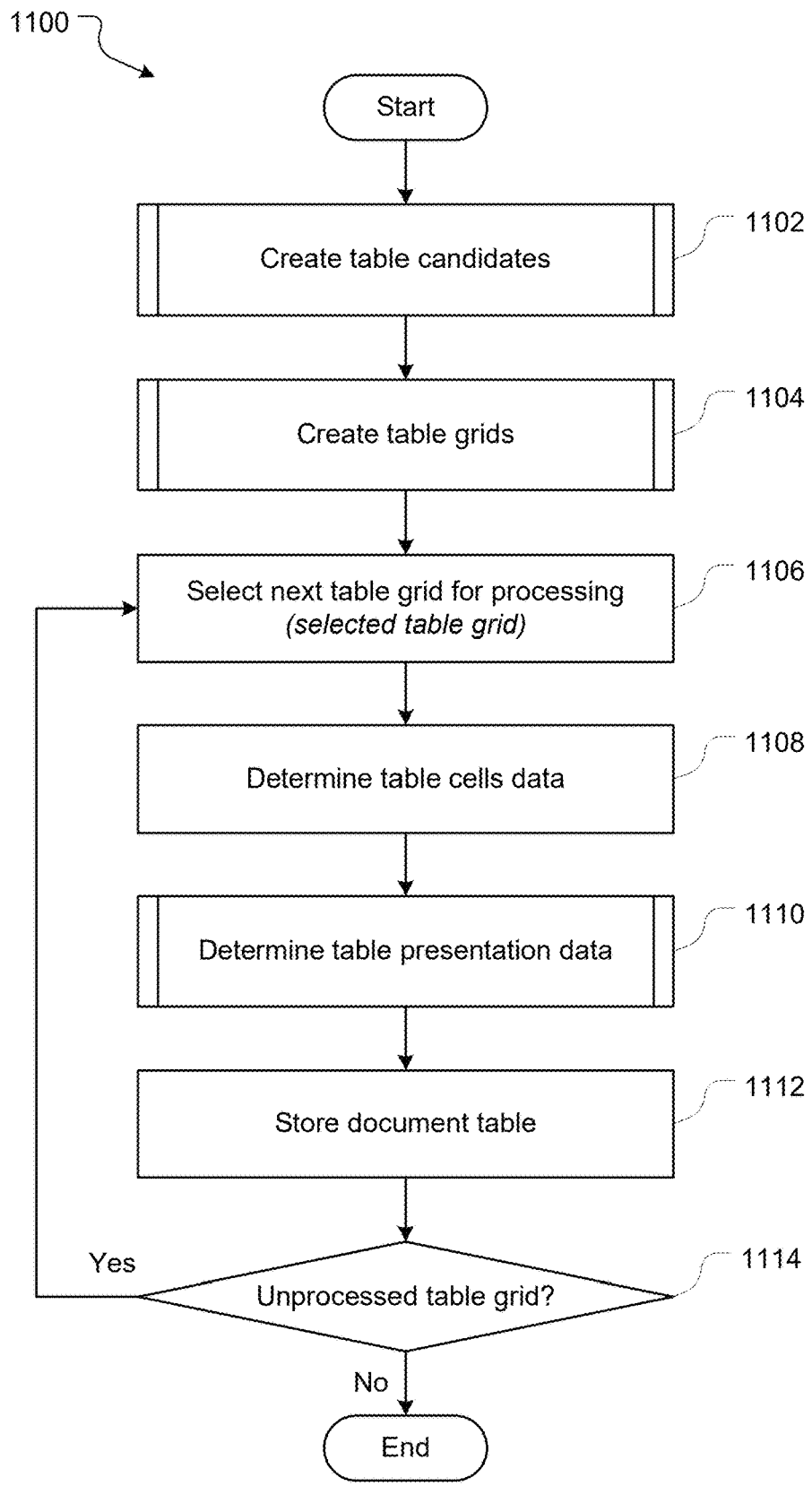
FIGS. 11-14 depict operations performed for identifying and storing document tables.

Turning to FIG. 11, a document table identification process 1100 will be described. Processing is described as being performed by the text processing module (TPM) 106, however processing could be performed by an alternative module, application, or group of modules/applications.

At step 1102, the TPM 106 creates table candidates (i.e., potential tables) based on the text blocks and text block links identified through methods described above. Details of the process at step 1102 is later described in relation to method 1200 of FIG. 12. At the conclusion of step 1102, a set of table candidates may be created for further processing. If no table candidate is created at step 1102, then the method 1100 will conclude without proceeding to the following steps.

At step 1104, the TPM 106 creates table grids based on the set of table candidates identified at step 1102. A table grid defines rows, columns, and cells corresponding to a document table wherein each table grid cell is associated with a text block. Details of the process at step 1104 are later described in relation to method 1300 of FIG. 13. If no table grid is found at step 1104, then the method 1100 will conclude without proceeding to the following steps.

At step 1106, the TPM 106 selects the next unprocessed table grid created at step 1104 for processing. This table grid is herein referred to as the selected table grid in describing the rest of the steps of the method 1100.

At step 1108, the TPM 106 determines document table cells data for the selected table grid. The TPM 106 traverses through all the cells of the selected table grid to build table cell data for each cell of the selected table grid. Given each cell of the selected table grid is associated with a text block, the process of determining the corresponding table cell data involves merging the contents of the text segments associated with the text block. For example, the TPM 106 may traverse through all the segments associated with the text block from left to right and top to bottom and, sequentially, merge the textual content of the text segments to form the corresponding table cell data.

In some embodiments, the TPM 106 may also determine other attributes of the text (e.g., font size, font name, boldness). The determination may be used to populate the table with the same or similar text in one or more of font size, font name, boldness, and other style characteristics.

In some embodiments, the TPM 106 may also include a unique identifier value in table cell data. The TPM 106 may generate a unique identifier in a variety of methods such as, e.g., by using random number generators, sequentially generated identifiers, or other methods.

At step 1110, the TPM 106 determines document table presentation data for the selected table grid. Details of this step are described later in relation to method 1400 of FIG. 14.

At step 1112, the TPM 106 generates an editable document table, that is, the TPM 106 stores the document table generated through the previous steps in a data format suitable for editing. An example of such editable data format is Office Open XML format. It will be appreciated that storing in other editable data formats is possible.

At step 1114, the TPM 106 determines if any unprocessed table grid exists. If such an unprocessed table grid exists, the process proceeds to step 1106 where the next table grid is selected for processing. Otherwise, the method 1100 concludes.

Figure 12:
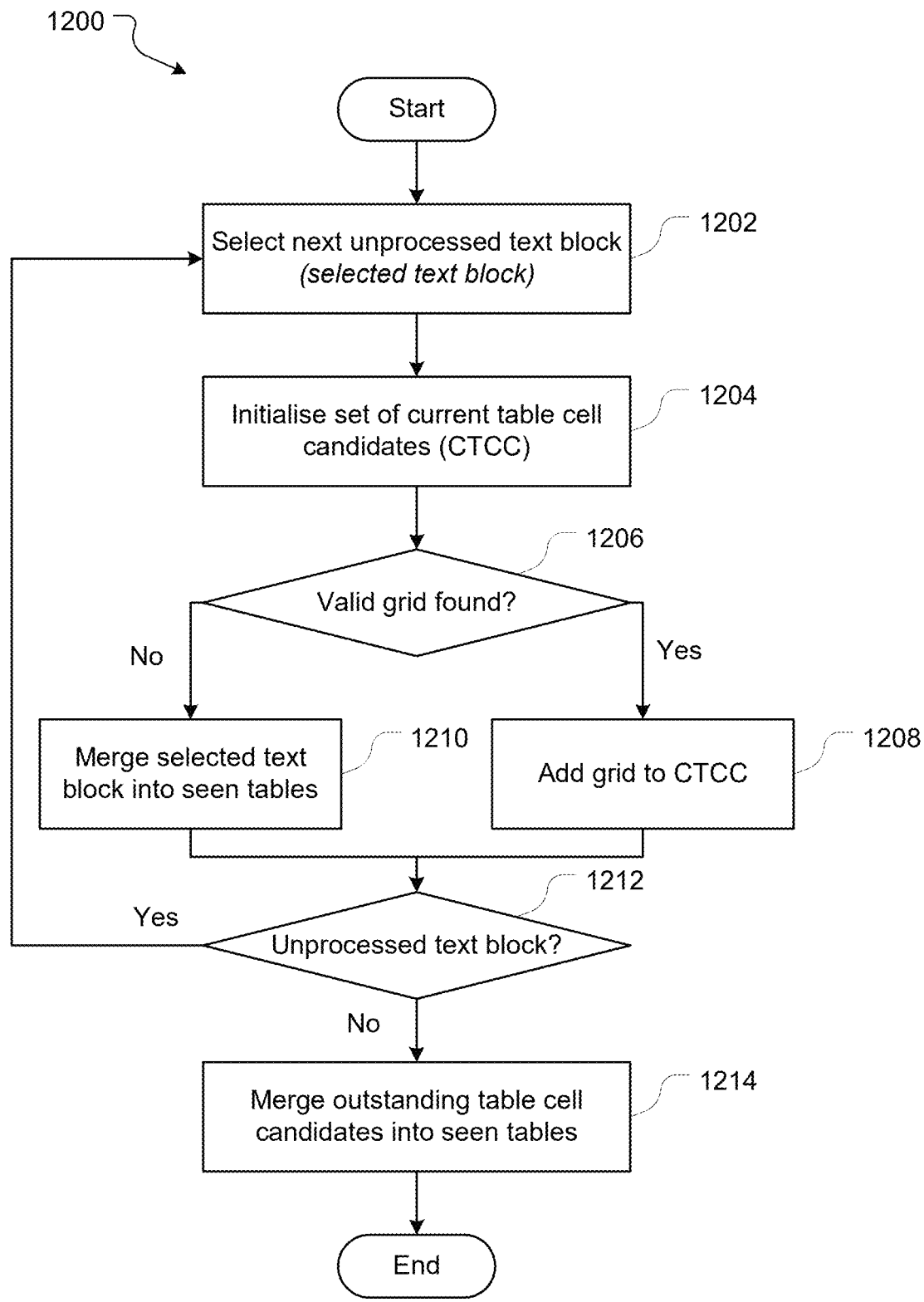

Turning to FIG. 12, a process 1200 will be described to create table candidates in a document. Processing is described as being performed by the text processing module (TPM) 106, however processing could be performed by an alternative module, application, or group of modules/applications.

As noted earlier, in some embodiments at step 310 the TPM 106 stores the text blocks and text block links as nodes and edges of an acyclic directed graph. In some embodiments, such a graph connects text blocks left to right and from top to bottom. In some embodiments, a text block (a graph node) may have up to three (zero, one, two, or three) edges to other text blocks (other graph nodes) positioned to the right of the text block and horizontally aligned with the text block. Similarly, a text block may have up to three edges to other text blocks positioned to the bottom of the text block and vertically aligned with the text block. Horizontal and vertical alignment of text blocks may be based in part on the alignment of their bounding boxes, either horizontally or vertically. The process 1200 to create table candidates is described herein with reference to such a graph.

As an initial step in preparation to perform the steps shown in FIG. 12, the TPM 106 creates two data sets as follows. The first data set, herein referred to as set of current table cell candidates (CTCC), is a collection of text blocks forming a grid of connected text blocks (i.e., text blocks organised into rows and columns). The CTCC is an intermediary data set that assists in various iterations of the method described below. The second data set, herein referred to as set of table candidates, is a collection of table grids wherein each table grid is a collection of text blocks forming a grid of connected text blocks.

At step 1202, the TPM 106 selects the next unprocessed text block for processing from the collection of text blocks together with their text block links. In describing the process 1200, the text block selected at step 1102 is referred to as the selected text block.

In some embodiments, the TPM 106 determines the next unprocessed text block for processing (at step 1202) through a depth-first search algorithm on each unseen text block. In other embodiments, other methods of determining the next unprocessed text block may be used.

At step 1204, the TPM 106 initialises the CTCC if necessary. To determine the necessity of this initialisation step, the TPM 106 may determine whether one or more conditions are met.

In some embodiments, the TPM 106 determines that it is unnecessary to initialise the CTCC if the CTCC is not empty (i.e., currently includes at least one text block).

In some embodiments, the TPM 106 determines whether the selected text block is connected to (i.e., has a link to) any of the table grids seen so far. That is, the TPM 106 may traverse through all table grids stored in the set of table candidates to determine if the selected text block is connected to one of the table grids in the set. The TPM 106 may consider the selected text block to be connected to a table grid if one or more conditions are satisfied.

For example, the selected text block is connected to a table grid if the selected text block has already been included in the table grid. This may have happened as a result of other text blocks having been processed by the method 1200 in earlier iterations of this method.

As another example, such a connection exists if the graph node representing the selected text block has a qualifying text block link to a graph node representing a text block which is included in a table grid. A qualifying text block link exists, for example, where the node that represents the selected text block has a valid vertical edge or a valid horizontal edge to a node in a table grid.

A vertical edge between a node that represents the selected text block (the first node) and a node in a table grid (the second node) is valid where there is no third text block (represented by a third node) horizontally linked to the first node and vertically intersecting with the second node. Such a vertical intersection exists if a horizontal line can be drawn that can pass through both the first node and the third node.

A horizontal edge between a node that represents the selected text block (the first node) and a node in a table grid (the second node) is valid where there is no third text block (represented by a third node) vertically linked to the first node and horizontally intersecting with the second node. Such a horizontal intersection exists if a vertical line can be drawn that can pass through both the first node and the third node.

As a further example, such a connection exists if a text block within the table grid is connected to the selected text block. As described above, the graph representing text block links may be connected in one direction only and, consequently, a connection between the selected text bock and a text block within the table grid may be represented by an edge from the text block within the table grid to the selected text block (and not the reverse).

If the TPM 106 determines that the selected text block is connected to a table grid seen so far, then the TPM 106 may determine that the set of current table cells required initialisation at step 1204.

If at step 1204, the TPM 106 determines that initialisation is required, the TPM 106 updates the set of current table cells to include the selected text block and all the text blocks included in the text grid connected to the selected text block.

At step 1206, the TPM 106 determines whether a valid grid can be detected starting from the selected text block. A valid grid (i.e., a two-dimensional collection of connected text blocks forming a grid, which can potentially form a table) exists starting from the selected text block if one or more conditions are met as exemplified below.

In some embodiments, in order to detect the existence of a valid grid the TPM 106, for example, firstly explores the horizontal and vertical edges of the selected text block. The TPM 106 may firstly select a horizontal edge of the selected text block and through this edge select another text block that is positioned to the right of the selected text block (the right neighbour). The TPM 106 may further select a vertical edge of the selected text block and through this edge select another text block that is positioned below the selected text block (the bottom neighbour). The TPM 106 may then determine if the bottom neighbour has a neighbouring text block to its right (the bottom-right neighbour). The TPM 106 may then determine if the right neighbour has an edge to the bottom-right neighbour. If all such conditions are met, the TPM 106 at step 1206 determines that the selected text block has neighbouring text blocks which are all connected.

In some embodiments, at step 1206 the TPM 106 may assess the validity of a grid, such as the selected text block and its connected neighbours as described above, by checking whether one or a combination of multiple conditions are met.

For example, the TPM 106 may require that the grid contains a specific number of cells (e.g., be a 2×2 grid).

As another example, the TPM 106 may require that the top-left cell of a 2×2 grid does not horizontally intersect with the bottom-right cell of the grid, and that the top-right cell of the grid does not horizontally intersect with the bottom-left cell of the grid. In other words, for example, a 2×2 grid is valid if a vertical separator line can be drawn separating the top-left and the bottom-left grid cells from the top-right and the bottom-right grid cells without the vertical separator line having to pass through any of the grid cells.

As another example, the TPM 106 may require that the top-left cell of a 2×2 grid does not vertically intersect with the bottom-right cell of the grid, and that the bottom-left cell of the grid does not vertically intersect with the top-right cell of the grid. In other words, for example, a 2×2 grid is valid if a horizontal separator line can be drawn separating the top-left and the top-right grid cells from the bottom-left and the bottom-right grid cells without the horizontal separator line having to pass through any of the grid cells.

If at step 1206 the TPM 106 determines that a valid grid cannot be detected starting from the selected text block, then the TPM 106 may attempt to detect a valid grid starting from the neighbour to the right of the selected text block (right neighbour). A right neighbour is identifiable through a graph edge from the selected text block to another text block to the right. The TPM 106 may then repeat the assessments described above (in relation to step 1206) to determine whether a valid grid can be detected starting from the right neighbour. The TPM 106 may continue attempting to detect a valid grid through the right neighbours until either a valid grid is found or there is no other neighbour to the right to process.

If at step 1206 the TPM 106 detects a valid grid, then the process proceeds to step 1208. Otherwise, the process proceeds to step 1210.

At step 1208, the TPM 106 adds all cells of the valid grid found at step 1206 to the CTCC. The method then proceeds to step 1212.

At step 1210, the TPM 106 attempts to merge the selected text block with the table grids seen so far. The TPM 106 firstly determines whether the selected text block is connected to any of the table grids seen so far. If such a connection exists, the TPM 106 updates the corresponding table grid to include the selected text block. Similar operations were described above in relation to step 1204.

At step 1210, the TPM 106 also empties the CTCC. The process then continues to step 1212.

At step 1212, the TPM 106 determines whether any text block is yet to be processed. If such a text block is found, then the process continues at step 1202 wherein the next text block is selected for processing. Otherwise, the process continues to step 1214.

At step 1214, the TPM 106 merges outstanding cells in the CTCC into the set of table cell candidates. The TPM 106 may traverse through all such outstanding cells to determine whether each cell is connected to a table grid in the set of table candidates. If such a connection exists, the TPM 106 may update the table grid to include the outstanding cell and all its connected cells. Similar steps were described above in relation to steps 1204 and 1210.

Figure 13:
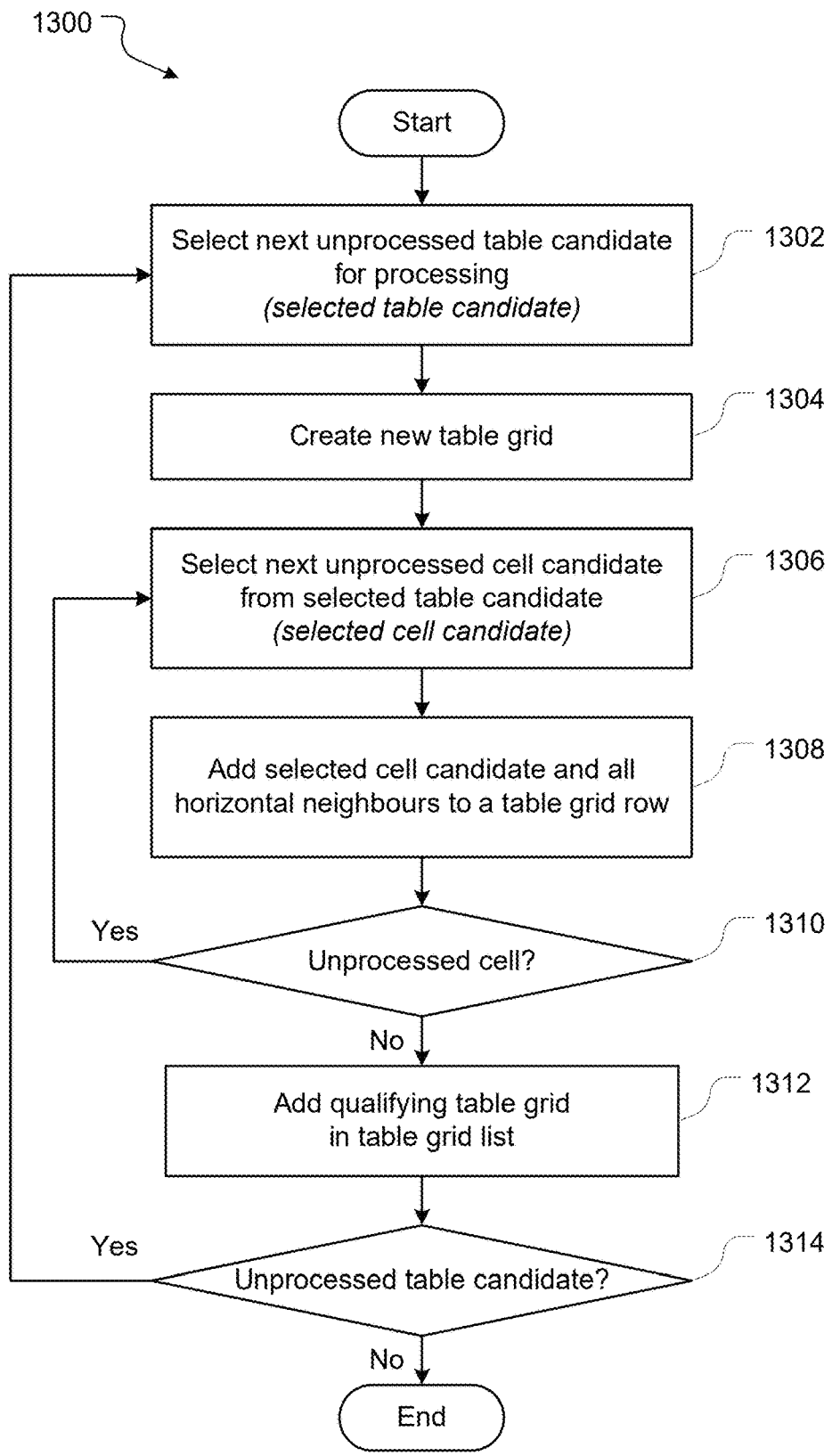

Turning to FIG. 13, a process 1300 will be described to determine table grids in a document. Processing is described as being performed by the text processing module (TPM) 106, however processing could be performed by an alternative module, application, or group of modules/applications.

At step 1302, the TPM 106 selects the next table candidate from the list of identified table candidates (described in relation to FIG. 12) for processing. This table candidate is herein referred to as selected table candidate.

At step 1304, the TPM 106 creates a new table grid.

At step 1306, the TPM 106 selects the next unprocessed cell candidate (corresponding to a text block) from the selected table candidate for processing. This cell will herein be referred to as the selected cell candidate.

At step 1308, the TPM 106 determines whether the selected cell candidate has one or more horizontal neighbouring cell candidates. If such neighbouring cells exist, the TPM 106 proceeds to add the selected cell candidate and all the horizontal neighbouring cell candidates to a single row in the table grid (created at step 1304).

In some embodiments, the TPM 106 determines the horizontal neighbouring cell of the selected cell candidate by identifying the closest horizontal neighbouring cell through the graph edges that exist between the selected cell candidate and the horizontally neighbouring cells. In some embodiments, the horizontal edges are traversed from left to right. The TPM 106 then continues the process by identifying the next closest horizontal neighbouring cell candidate and associating such cell to the same row as described. When there are no further horizontal neighbouring cell candidates to process, the TPM 106 proceeds to step 1310.

At step 1310, the TPM 106 determines whether there is any cell candidate in the selected table candidate that is yet to be processed. If such a cell candidate exists, the TPM 106 proceeds to step 1302. Otherwise, the TPM 106 proceeds to step 1312.

At step 1312, the TPM 106 further assesses the validity of the table grid for forming a document table. If the TPM 106 determines that the table grid is valid for forming a document table, the table grid is added to a list of table grids for further processing. Otherwise, the TPM 106 discards the table grid.

In some embodiments, the TPM 106 may determine that a table grid is valid for forming a document table if the table grid has more than two columns or more than two rows (e.g., a 3×3, 2×3 or 3×2 table grid).

At step 1314, the TPM 106 determines whether there is any table candidate that is yet to be processed. If such a table candidate exists, the TPM 106 proceeds to step 1302. Otherwise, the method 1300 concludes.

Figure 14:
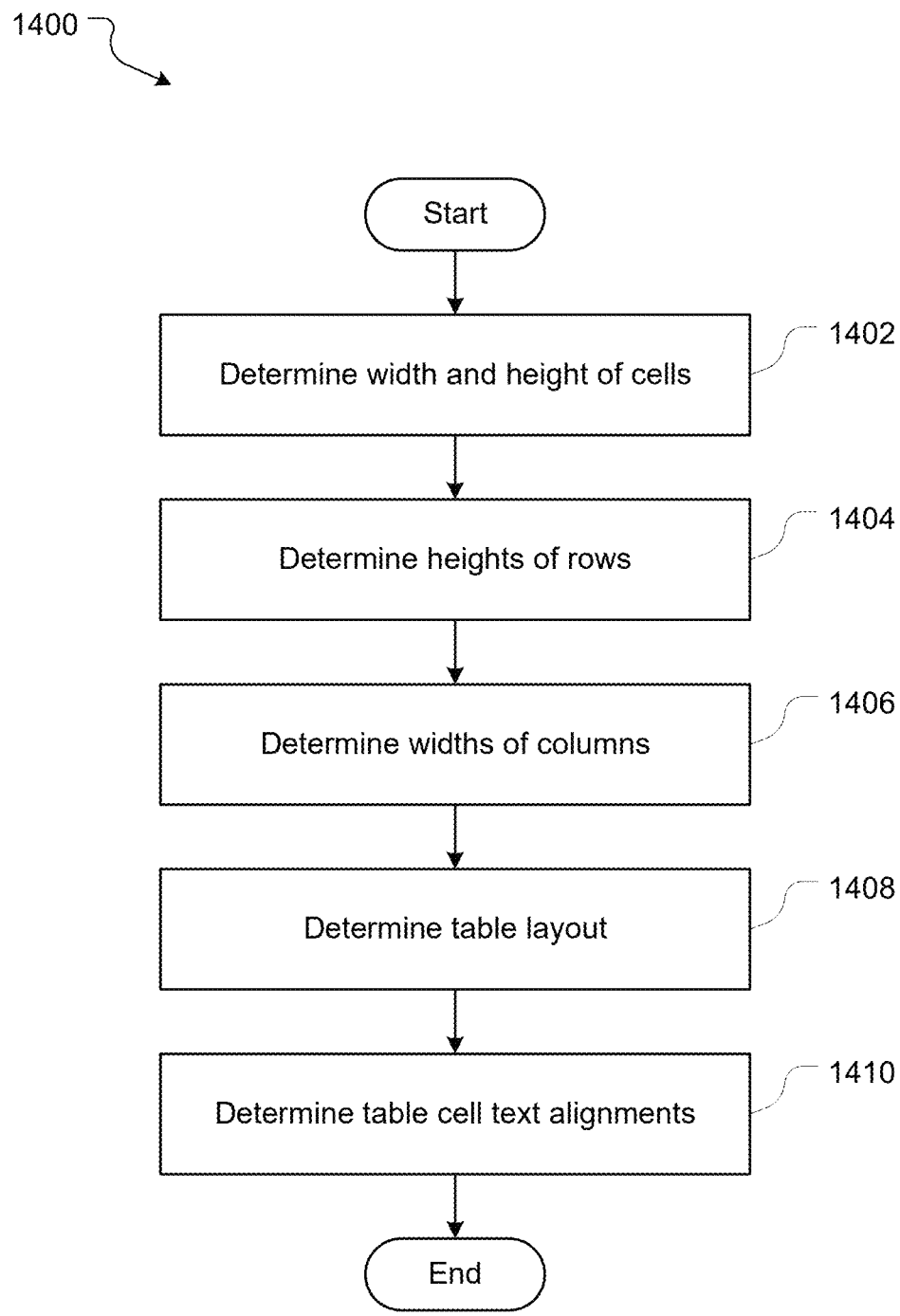

Turning to FIG. 14, a process 1400 will be described to determine document table presentation data. Processing is described as being performed by the text processing module (TPM) 106, however processing could be performed by an alternative module, application, or group of modules/applications.

At step 1402, the TPM 106 determines width and height of each cell in a document table corresponding with the table grid. In some embodiments, this determination is based on the text segments associated with the text blocks of a table grid. More specifically, the TPM 106 may determine the width of a document table cell based on the distance between the left-x of the left-most text segment and the right-x of the right-most text segment of the segments associated with the text block (of the corresponding table grid cell). Similarly, the TPM 106 may determine the height of a document table cell based on the distance between the top-y of the top-most text segment and the bottom-y of the lowest text segment associated with the text block (of the corresponding table grid cell). In other words, width and height of each cell corresponds to width and height of a bounding box that encompasses all the segments (and, in turn, all the glyphs) associated with the relevant text block.

At step 1404, the TPM 106 determines height of rows of the document table corresponding to the table grid. In some embodiments, the TPM 106 may make this determination based on height of all the cells associated with each row. For example, the TPM 106 may determine height of a row to be equivalent to height of the tallest cell associated with that row. The TPM 106 may use other methods to determine height of rows (e.g., using predetermined row height values, or using predetermined minimum or maximum values).

At step 1406, the TPM 106 determines width of columns of the document table corresponding to the table grid. In some embodiments, the TPM 106 may make this determination based on width of all the cells associated with each column. For example, the TPM 106 may determine width of a column to be equivalent to width of the widest cell associated with that column. The TPM 106 may use other methods to determine width of columns (e.g., using predetermined column height values, or using predetermined minimum or maximum values).

At step 1408, the TPM 106 determines layout of the document table based on the row heights and column widths determined above as well as the associated table grid. The determination of the layout of the document table may include determining the position of the document table in a document (e.g., determining the position of the top-left corner of the document table), and the table width and height.

The position of the top-left corner (i.e., table's top-x and top-y) of the table may be determined based on, for example, the position of the text segments associated with the top-left text block (cell) of the table. For example, the table's top-x may be determined based on the left-x value of the left-most segment associated with the text block, and the table's top-y may be determined based on the top-y value of the top-most segment associated with the text block. It will be appreciated that other methods for determining the position of the top-left corner of the document table are possible.

The height of the document table may be determined based on the height of all the rows of the table. For example, the TPM 106 may add all the row heights determined at step 1404 to determine the height of the document table. In other embodiments, other methods or a combination of methods may be used (e.g., applying spacing margin values, or using a predetermined acceptable range for the table height).

The width of the document table may be determined based on the width of all the columns of the table. For example, the TPM 106 may add all the column widths determined at step 1406 to determine the width of the document table. In other embodiments, other methods or a combination of methods may be used (e.g., applying spacing margin values, or using a predetermined acceptable range for the table width).

At sept 1410, the TPM 106 determines text alignment for all cells of the document table. As previously described, each text block is associated with a text alignment (e.g., left-aligned, centre-aligned, right-aligned, and justified). At step 1410, the text alignment associated with each text block is used to determine the text alignment of the corresponding document table cell.

As noted earlier in relation to the step 302 of method 300, the TPM 106 receives a plurality of glyphs contained in a document wherein each glyph in the plurality of glyphs is associated with a document line. Such association of glyphs with document lines may be carried out by various methods and an example method is described herein.

The example document line identification processing is described as being performed by the text processing module (TPM) 106, however, processing could be performed by an alternative module, application, or group of modules/applications.

Turning to FIG. 15, a document page 1502 is shown containing a variety of textual content. The textual contents on the page 1502 are stored in the corresponding document data as a collection of glyphs wherein each glyph is associated with glyph properties. In some embodiments, examples of such properties include position data of a glyph within a document page (i.e., left x, top y, right x, and bottom y), rotation data, and font data.

An example glyph included in PDF data of the page 1502 is glyph 1504, which corresponds to character '0'. Another example glyph is glyph 1506, which corresponds to another character '0'. It can be seen in FIG. 15 that the page 1502 contains a number of other glyphs in different positions on the page.

Upon receiving the document data, the TPM 106 processes each individual glyph to identify its glyph baseline. A glyph baseline is a bottom boundary for a glyph and may be determined using a variety of methods. For example, the TPM 106 may determine a glyph baseline based on the glyph properties associated with the glyph. Alternatively, the TPM may determine a glyph baseline based on other data associated with the glyph which may be used to determine position data, size, and rotation of a glyph within a document page.

For example, in a document, a baseline for a glyph may be determined by two points: [left x, bottom y] and [right x, bottom y]. It will be appreciated that the TPM 106 may use other methods to determine glyph baselines. For example, the TPM 106 may use each or a combination of position data, rotation data, and font data to determine a glyph baseline. The TPM 106 may further apply determinations based on predefined threshold values (e.g., the size of a glyph may not exceed a predefined threshold).

The TPM 106 determines the baseline for all the glyphs included in the page 1502. Turning to FIG. 16, each glyph on the page 1502 is shown together with its corresponding example baseline. For example, the horizontal lines 1604 and 1606 show the example baselines respectively for the glyphs 1504 and 1506.

The TPM 106 may use glyph baselines to associate each glyph with a document line. It will be appreciated that the TPM 106 may associate each glyph with a document line using other methods. For example, such determination may be based on the top or centre point of each glyph. Furthermore, such determination may also rely on rotation data and/or font data. Other methods are possible.

For example, the TPM 106 may use the horizontal position of the baseline of each glyph (i.e., bottom y) to associate the glyph with a document line. In one embodiment, all the glyphs having baselines in the same horizontal position may be associated with a single document line. In another embodiment, all the glyphs having baselines within a predefined threshold vertical distance from each other may be associated with a single document line. In other embodiments, other methods or a combination of methods may be used.

Turning to FIG. 17, an example result of creating document lines and associating glyphs with document lines is shown on page 1502. It can be seen, for example, that the glyph 1504 and glyph 1704 are associated with document line 1708. Similarly, the glyph 1506 and glyph 1706 are associated with document line 1710. Examples of other document lines on page 1502 are shown in FIG. 17 with similar boxes to those of lines 1708 and 1710.

The disclosure above focused on tables containing text. However, the methods of identifying tables disclosed herein are not necessarily limited to tables containing text and may be applied, for example, to tables containing other elements, such as images. For example, instead of operating based on lines of text, the method may operate based on identified lines of images or based on identified lines of text and images.

The flowcharts illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, operations, steps, or elements.

Unless required by context, the terms "first", "second", etc. are used to differentiate between various elements and features and not in an ordinal sense. For example, a first glyph set could be termed a second glyph set, and, similarly, a second glyph set could be termed a first glyph set, without departing from the scope of the described examples.

Selected examples or embodiments of the present disclosure are described in the following clauses A1 to A40.

A1. A computer-implemented method comprising:
  accessing data defining a plurality of glyphs, including data associating each of the plurality of glyphs with one of a plurality of document lines;
  generating document layout data based on the accessed data, comprising generating data identifying:
    a plurality of text segments within a said document line, each text segment encompassing a group of one or more of the plurality of glyphs;
    a plurality of text segment links;
  a plurality of text blocks of one or more of the text segments, wherein a said text block of two or more segments is formed based on one or more of the text segment links; and
    a plurality of text block links; and identifying contents of cells of at least one document table based on the document layout data and generating an output based on the identified contents of cells of at least one document table;
  wherein:
    each text segment link represents an association between two text segments; and
    each text block link represents an association between two text blocks.

A2. The computer-implemented method of clause A1, wherein the output comprises a document comprising at least one editable document table corresponding to the at least one document table.

A3. The computer-implemented method of clause A1 or clause A2, wherein each text segment link is generated based on an alignment of the two text segments.

A4. The computer-implemented method of any one of clauses A1 to A3, wherein each text block link is generated based on an alignment of the two text blocks.

A5. The computer-implemented method of any one of clauses A1 to A4, wherein the data defining a plurality of glyphs is portable document format (PDF) data defining a plurality of glyphs in a PDF document.

A6. The computer-implemented method of clause A3 or either clause A4 or A5 when dependent on clause A3, wherein identifying the plurality of text segment links comprises determining that text segments with said alignment are adjacent text segments.

A7. The computer-implemented method of clause A6, wherein the alignment of the two text segments is a vertical alignment and determining that the text segments are adjacent text segments comprises determining that there is not a third text segment that horizontally intersects the two text segments.

A8. The computer-implemented method of clause A7, wherein the alignment of the two text segments is one or more of a left alignment, a centre alignment, and a right alignment.

A9. The computer-implemented method of clause A6, wherein the alignment of the two text segments is a horizontal alignment and determining that the text segments are adjacent text segments comprises determining that there is not a third text segment that vertically intersects the two text segments.

A10. The computer-implemented method of clause A9, wherein the alignment of the two text segments is one or more of a top alignment, a middle alignment, and a bottom alignment.

A11. The computer-implemented method of clause A4 or any one of clauses A5 to A10 when dependent on clause A4, wherein identifying the plurality of text block links comprises determining that text blocks with said alignment are adjacent text blocks.

A12. The computer-implemented method of clause A11, wherein the alignment of the two text blocks is a vertical alignment and determining that the text blocks are adjacent text blocks comprises determining that there is not a text block that horizontally intersects the two text blocks.

A13. The computer-implemented method of clause A12, wherein the alignment of the two text blocks is one or more of a left alignment, a centre alignment, and a right alignment.

A14. The computer-implemented method of clause A11, wherein the alignment of the two text blocks is a horizontal alignment and determining that the text blocks are adjacent text blocks comprises determining that there is not a text block that vertically intersects the two text blocks.

A15. The computer-implemented method of clause A14, wherein alignment of the two text blocks is one or more of a top alignment, a middle alignment, and a bottom alignment.

A16. The computer-implemented method of any one of clauses A1 to A15, wherein at least one of:
the text segments and the text segment links; and
the text blocks and the text block links;
are represented respectively as nodes and edges of an acyclic directed graph.

A17. The computer-implemented method of any one of clauses A1 to A16, wherein the step of identifying the contents of cells of at least one document table includes:
creating at least one table grid associated with the document table based on the plurality of text blocks and the plurality of text block links, wherein each cell in the table grid corresponds to a text block included in the plurality of text blocks.

A18. The computer-implemented method of clause A17, wherein each cell of the document table corresponds to one cell of the table grid; and
the content of a said document table cell is generated by merging the glyphs associated with the text segments associated with the text block corresponding to the document table cell.

A19. The computer-implemented method of clause A17 or clause A18, wherein the method further includes determining table presentation data associated with the document table based on the table grid associated with the document table.

A20. The computer-implemented method of clause A19, wherein the table presentation data includes one or more of the following:
width and height of at least one of the document table cells;
height of at least one of the document table rows;
width of at least one of the document table columns;
width and height of the document table;
position of the document table in a document; and
alignment of the content of at least one of the document table cells.

A21. The computer-implemented method of clause A20, wherein the width and height of at least one of the document table cells is determined based on the width and height of a bounding box that encompasses all the segments and the glyphs associated with the corresponding table grid cell.

A22. The computer-implemented method of clause A20 or clause A21, wherein the height of at least one of the document table rows is determined based on the height of all the table grid cells associated with the row.

A23. The computer-implemented method of any one of clauses A20 to A22, wherein the width of at least one of the document table columns is determined based on the width of all the table grid cells associated with the column.

A24. The computer-implemented method of any one of clauses A20 to A23, wherein the width and height of the document table is determined based respectively on the width of all the columns and height of all the rows of the table grid.

A25. The computer-implemented method of any one of clause A20 to A24, wherein the position of the document table in a document is determined based on the text blocks associated with the table grid.

A26. The computer-implemented method of any one of clauses A1 to A25, wherein the editable document table includes text with an alignment and wherein the alignment of the text is determined based on the text block of the plurality of text blocks that has corresponding content and one or more of the text block links for that text block.

A27. A computer-implemented method comprising:
identifying from data of a first document, a plurality of blocks of text segments in the first document, wherein each block is identified based on a determination that a group of text segments of the document are adjacent each other and vertically and horizontally aligned in a grid;
identifying a plurality of table cells based on the plurality of blocks of text segments, each table cell comprising one or more blocks of text segments, wherein at least one table cell comprises a plurality of blocks of text segments and is identified based on a determination that a group of text blocks of the document are adjacent each other and vertically and horizontally aligned in a grid; and determining neighbouring table cells and forming data defining a table of the neighbouring table cells in a second document.

A28. The computer-implemented method of clause A27, wherein the data of the first document is portable document format (PDF) data.

A29. The computer-implemented method of clause A27 or clause A28, wherein the identification of each block based on a determination that a group of text segments of the document are adjacent each other and vertically or horizontally aligned in a grid comprises:

identifying a plurality of text segment links, each text segment link representing an association between two text segments and is generated based on an alignment of the two text segments.

A30. The computer-implemented method of clause A29, wherein the alignment of the two text segments is a vertical alignment and determining that the text segments are adjacent text segments comprises determining that there is not a third text segment that horizontally intersects the two text segments.

A31. The computer-implemented method of clause A30, wherein the alignment of the two text segments is one or more of a left alignment, a centre alignment, and a right alignment.

A32. The computer-implemented method of clause A29, wherein the alignment of the two text segments is a horizontal alignment and determining that the text segments are adjacent text segments comprises determining that there is not a third text segment that vertically intersects the two text segments.

A33. The computer-implemented method of clause A32, wherein the alignment of the two text segments is one or more of a top alignment, a middle alignment, and a bottom alignment.

A34. The computer-implemented method of any of clauses A27 to A33, wherein the identification of a plurality of table cells based on the plurality of blocks of text segments comprises:

identifying a plurality of text block links wherein each text block link represents an association between two text blocks and is generated based on an alignment of the two text blocks.

A35. The computer-implemented method of clause A34, wherein the alignment of the two text blocks is a vertical alignment and determining that the text blocks are adjacent text blocks comprises determining that there is not a third text block that horizontally intersects the two text blocks.

A36. The computer-implemented method of clause A35, wherein the alignment of the two text blocks is one or more of a left alignment, a centre alignment, and a right alignment.

A37. The computer-implemented method of clause A34, wherein the alignment of the two text blocks is a horizontal alignment and determining that the text blocks are adjacent text blocks comprises determining that there is not a third text block that vertically intersects the two text blocks.

A38. The computer-implemented method of clause A37, wherein the alignment of the two text segments is one or more of a top alignment, a middle alignment, and a bottom alignment.

A39. A computer system configured to perform the method of any one of clauses A1 to A38.

A40. A non-transitory computer readable memory comprising instructions to cause a computer processor to perform the method of any one of clauses A1 to A38.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

The invention claimed is:

1. A computer-implemented method comprising:
    accessing data defining a plurality of glyphs, including data associating each of the plurality of glyphs with one of a plurality of document lines;
    generating document layout data based on the accessed data, comprising generating data identifying:
        a plurality of text segments within a said document line, each text segment encompassing a group of one or more of the plurality of glyphs;
        a plurality of text segment links;
        a plurality of text blocks of one or more of the text segments, at least one of the plurality of text blocks comprising a plurality of text segments,
        wherein a said text block of two or more segments is formed based on one or more of the text segment links; and
        a plurality of text block links; and
    identifying contents of cells of at least one document table based on the document layout data and generating an output based on the identified contents of cells of at least one document table;
    wherein:
        each text segment link represents an association between two text segments; and
        each text block link represents an association between two text blocks.

2. The computer-implemented method of claim 1, wherein the output comprises a document comprising at least one editable document table corresponding to the at least one document table.

3. The computer-implemented method of claim 2, wherein the editable document table includes text with an alignment and wherein the alignment of the text is determined based on the text block of the plurality of text blocks that has corresponding content and one or more of the text block links for that text block.

4. The computer-implemented method of claim 1, wherein each text segment link is generated based on an alignment of the two text segments.

5. The computer-implemented method of claim 4, wherein identifying the plurality of text segment links comprises determining that text segments with said alignment are adjacent text segments.

6. The computer-implemented method of claim 5, wherein the alignment of the two text segments is a vertical alignment, determining that the text segments are adjacent text segments comprises determining that there is not a third text segment that horizontally intersects the two text segments, and the alignment of the two text segments is one or more of a left alignment, a centre alignment, and a right alignment.

7. The computer-implemented method of claim 5, wherein the alignment of the two text segments is a horizontal alignment, determining that the text segments are adjacent text segments comprises determining that there is not a third text segment that vertically intersects the two text segments, and the alignment of the two text segments is one or more of a top alignment, a middle alignment, and a bottom alignment.

8. The computer-implemented method of claim 1, wherein each text block link is generated based on an alignment of the two text blocks.

9. The computer-implemented method of claim 8, wherein identifying the plurality of text block links comprises determining that text blocks with said alignment are adjacent text blocks.

10. The computer-implemented method of claim 9, wherein the alignment of the two text blocks is a vertical alignment, determining that the text blocks are adjacent text blocks comprises determining that there is not a text block that horizontally intersects the two text blocks, and the alignment of the two text blocks is one or more of a left alignment, a centre alignment, and a right alignment.

11. The computer-implemented method of claim 9, wherein the alignment of the two text blocks is a horizontal alignment and determining that the text blocks are adjacent text blocks comprises determining that there is not a text block that vertically intersects the two text blocks, and the alignment of the two text blocks is one or more of a top alignment, a middle alignment, and a bottom alignment.

12. The computer-implemented method of claim 1, wherein the data defining a plurality of glyphs is portable document format (PDF) data defining a plurality of glyphs in a PDF document.

13. The computer-implemented method of claim 1, wherein at least one of:
   the text segments and the text segment links; and
   the text blocks and the text block links;
are represented respectively as nodes and edges of an acyclic directed graph.

14. The computer-implemented method of claim 1, wherein the step of identifying the contents of cells of at least one document table includes:
   creating at least one table grid associated with the document table based on the plurality of text blocks and the plurality of text block links, wherein each cell in the table grid corresponds to a text block included in the plurality of text blocks.

15. The computer-implemented method of claim 14, wherein each cell of the document table corresponds to one cell of the table grid; and
   the content of a said document table cell is generated by merging the glyphs associated with the text segments associated with the text block corresponding to the document table cell.

16. The computer-implemented method of claim 14, wherein the method further includes determining table presentation data associated with the document table based on the table grid associated with the document table.

17. The computer-implemented method of claim 16, wherein the table presentation data includes one or more of the following:
   width and height of at least one of the document table cells;
   height of at least one of the document table rows;
   width of at least one of the document table columns;
   width and height of the document table;
   position of the document table in a document; and
   alignment of the content of at least one of the document table cells.

18. The computer-implemented method of claim 17, wherein the width and height of at least one of the document table cells is determined based on the width and height of a bounding box that encompasses all the segments and the glyphs associated with the corresponding table grid cell.

19. The computer-implemented method of claim 17, wherein the height of at least one of the document table rows is determined based on the height of all the table grid cells associated with the row.

20. The computer-implemented method of claim 17, wherein the width of at least one of the document table columns is determined based on the width of all the table grid cells associated with the column.

21. The computer-implemented method of claim 17, wherein the width and height of the document table is determined based respectively on the width of all the columns and height of all the rows of the table grid.

22. The computer-implemented method of claim 17, wherein the position of the document table in a document is determined based on the text blocks associated with the table grid.

* * * * *